US011089301B2

(12) United States Patent
Sasai et al.

(10) Patent No.: US 11,089,301 B2
(45) Date of Patent: *Aug. 10, 2021

(54) IMAGE ENCODING METHOD, IMAGE DECODING METHOD, IMAGE ENCODING DEVICE, IMAGE DECODING DEVICE, AND IMAGE ENCODING/DECODING DEVICE

(71) Applicant: Sun Patent Trust, New York, NY (US)

(72) Inventors: Hisao Sasai, Osaka (JP); Takahiro Nishi, Nara (JP); Youji Shibahara, Tokyo (JP); Toshiyasu Sugio, Osaka (JP); Kyoko Tanikawa, Osaka (JP); Toru Matsunobu, Osaka (JP); Kengo Terada, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,330

(22) Filed: Apr. 16, 2020

(65) Prior Publication Data
US 2020/0244957 A1    Jul. 30, 2020

Related U.S. Application Data

(63) Continuation of application No. 16/108,428, filed on Aug. 22, 2018, now Pat. No. 10,666,942, which is a
(Continued)

(51) Int. Cl.
*H04N 19/103* (2014.01)
*H04N 19/169* (2014.01)
(Continued)

(52) U.S. Cl.
CPC ......... *H04N 19/117* (2014.11); *H04N 19/136* (2014.11); *H04N 19/176* (2014.11); *H04N 19/61* (2014.11)

(58) Field of Classification Search
CPC .... H04N 19/117; H04N 19/176; H04N 19/61; H04N 19/136
See application file for complete search history.

(56) References Cited

U.S. PATENT DOCUMENTS 7,932,843 B2 * 4/2011 Demircin ............... H03M 7/48
                                                341/107
8,045,615 B2 * 10/2011 Liang ..................... H04N 19/86
                                                375/240.03
(Continued)

FOREIGN PATENT DOCUMENTS

JP    2003-348597    12/2003
JP    2010-525760    7/2010
(Continued)

OTHER PUBLICATIONS

Benjamin Bross, High efficiency video coding (HEVC) text specification draft 6, Feb. 1-10, 2012 (Year: 2012).*
(Continued)

*Primary Examiner* — Philip P. Dang
(74) *Attorney, Agent, or Firm* — Wenderoth, Lind & Ponack, L.L.P.

(57) ABSTRACT

A decoding method includes: predicting a current block in an image using a reference block, to generate a prediction block; and generating a reconstructed block using the prediction block, wherein the generating includes: filtering for a boundary between the reconstructed block and a decoded neighboring block, using a first filter strength set using first prediction information for prediction of the current block and second prediction information for prediction of the decoded neighboring block; filtering for the boundary using a second filter strength set without using the second prediction information of the current block and the decoded neighboring block; and switching whether to execute the second filtering, based on the boundary, wherein the first
(Continued)

filtering is in-loop filtering in which a filtered reconstructed block is used as a reference block for another block, and the second filtering is post filtering outside the loop.

2 Claims, 30 Drawing Sheets

Related U.S. Application Data continuation of application No. 15/794,385, filed on Oct. 26, 2017, now Pat. No. 10,116,935, which is a continuation of application No. 14/487,158, filed on Sep. 16, 2014, now Pat. No. 9,832,466, which is a continuation of application No. PCT/JP2013/001272, filed on Mar. 1, 2013.

(60) Provisional application No. 61/613,646, filed on Mar. 21, 2012.

(51) Int. Cl.
  *H04N 19/80* (2014.01)
  *H04N 19/117* (2014.01)
  *H04N 19/176* (2014.01)
  *H04N 19/61* (2014.01)
  *H04N 19/136* (2014.01)

(56) References Cited

U.S. PATENT DOCUMENTS

| | | | | |
|---|---|---|---|---|
| 8,102,920 | B2* | 1/2012 | Suh | H04N 21/4382 375/240.27 |
| 2005/0008240 | A1 | 1/2005 | Banerji | |
| 2006/0126725 | A1* | 6/2006 | Zeng | H04N 19/61 375/240.03 |
| 2007/0025448 | A1* | 2/2007 | Cha | H04N 19/86 375/240.24 |
| 2008/0267297 | A1* | 10/2008 | Sampedro | H04N 19/174 375/240.24 |
| 2008/0317377 | A1* | 12/2008 | Saigo | H04N 19/61 382/274 |
| 2009/0003446 | A1* | 1/2009 | Wu | H04N 19/587 375/240.16 |
| 2009/0028249 | A1* | 1/2009 | Gomila | H04N 19/51 375/240.29 |
| 2009/0097575 | A1* | 4/2009 | Teng | H04N 19/157 375/240.27 |
| 2009/0323826 | A1 | 12/2009 | Wu | |
| 2010/0027686 | A1* | 2/2010 | Zuo | H04N 19/46 375/240.29 |
| 2010/0232521 | A1 | 9/2010 | Hagendorf | |
| 2010/0239002 | A1* | 9/2010 | Park | H04N 19/593 375/240.12 |
| 2011/0110427 | A1* | 5/2011 | Teng | H04N 19/176 375/240.16 |
| 2011/0134996 | A1* | 6/2011 | Nandy | H04N 19/44 375/240.02 |
| 2011/0142134 | A1* | 6/2011 | Wahadaniah | H04N 19/124 375/240.16 |
| 2011/0188768 | A1* | 8/2011 | Pateux | H04N 19/61 382/238 |
| 2012/0020580 | A1* | 1/2012 | Sasai | H04N 19/14 382/233 |
| 2012/0163452 | A1* | 6/2012 | Horowitz | H04N 19/70 375/240.12 |
| 2013/0016771 | A1* | 1/2013 | Misra | H04N 19/43 375/240.03 |
| 2013/0016786 | A1* | 1/2013 | Segall | H04N 19/174 375/240.16 |

FOREIGN PATENT DOCUMENTS

| | | |
|---|---|---|
| JP | 2011-9887 | 1/2011 |
| JP | 2011-501534 | 1/2011 |
| WO | 2008/134482 | 11/2008 |

OTHER PUBLICATIONS

ITU-T H.264, (Series H: Audiovisual and Multimedia Systems Infrastructure of audiovisual services—Coding of moving video—Advanced video coding for generic audiovisual services), Jan. 2012 (Year: 2012).*
Bross et al., (High efficiency video coding (HEVC) text specification draft 5), Nov. 21-30, 2011 (Year: 2011).*
Chia-Yang Tsai, Slice Boundary Processing and Picture Layer Raw Byte Sequence Payload, JCTVC-D128, Jan. 20-28, 2011 (Year: 2011).*
Chih-Ming Fu, "Sample Adaptive Offset with Padding at LCU, Slice, and Image Boundaries", JCTVC-F093, Jul. 14-22, 2011 (Year: 2011).*
Chia-Yang Tsai, "AHG4: Non-cross-tiles loop filtering for independent tiles", JCTVC-G194, Nov. 21-30, 2011 (Year: 2011).*
International Search Report (in English language) issued in International Application No. PCT/JP2013/001272 dated Apr. 23, 2013.
ISO/IEC 14496-10 [MPEG-4 Part 10 Advanced Video Coding].
Benjamin Bross et al. "WD5: Working Draft 5 of High-Efficiency Video Coding", Joint Collaborative Team on Video Coding (JCT-VC) of ITU-T SG16 WP3 and ISO/IEO JTC1/SC29/WG11, 7th Meeting: Geneva, CH, Nov. 21-30, 2011, JCTVC-G1103_d9.
Ye-Kui Wang et al., Dependency and loop filtering control over tile boundaries, Joint Collaborative Team on Video Coding (JCT-VC) of ITU-T SG16 WP3 and ISO/IEC JTC1/SC29/WG11, JCTVC-G317, 7th Meeting: Geneva, CH Nov. 2011, pp. 1-7.
Arild Fuldseth et al., "Tiles", Joint Collaborative Team on Video Coding (JCT-VC) of ITU-T SG16 WP3 and ISO/IEC JTC1/SC29/WG11, JCTVC-F335, 6th Meeting: Torino, IT, Jul. 2011, pp. 1-15.
Chia-Yang Tsai et al., "AHG4: Non-cross-tiles loop filtering for independent tiles", Joint Collaborative Team on Video Coding (JCT-VC) of ITU-T SG16 WP3 and ISO/IEC JTC 1/SC 29/WG 11, JCTVC-G194_r5, 7th Meeting Geneva, CH, Nov. 2011, pp. 1-6.
Hisao Sasai et al., On Deblocking process simplification for slice and tile boundaries, Joint Collaborative Team on Video Coding (JCT-VC) of ITU-T SG 16 WP3 and ISO/IEC JTC 1/SC 29/WG 11, JCTVC-I0140, 9th Meeting: Geneva, CH, May 2012, pp. 1-7.
ITU-T H.264, (Series H: Audiovisual and Multimedia Systems Infrastructure of audiovisual services—Coding of moving video—Advanced video coding for generic audiovisual services), Jan. 2012.
Bross et al., (High efficiency video coding (HEVC) text specification draft 6), Feb. 10, 2012.
Chia-Yang Tsai, "Slice Boundary Processing and Picture Layer Raw Byte Sequence Payload", JCTVC-D128, Jan. 20-28, 2011.
Chih-Ming Fu, "Sample Adaptive Offset with Padding at LCU, Slice, and Image Boundaries", JCTVC-F093, Jul. 14-22, 2011.
Chia-Yang Tsai, "AHG4: Non-cross-tiles loop filtering for independent tiles", JCTVC-G194, Nov. 21-30, 2011.
Bross et al., (High efficiency video coding (HEVC) text specification draft 5), Nov. 21-30, 2011.

* cited by examiner

——— Tile boundary  ◯ Slice header
— — — Slice boundary

——— Tile boundary  ◯ Slice header
— — — Slice boundary

FIG. 9A

| post_filter_hint( payloadSize ) { | Descriptor |
|---|---|
|   filter_hint_size_y | ue(v) |
|   filter_hint_size_x | ue(v) |
|   filter_hint_type | u(2) |
|   for( colour_component=0; colour_component<3; colour_component++) | |
|     for( cy =0; cy<filter_hint_size_y; cy++) | |
|       for( cx =0; cx<filter_hint_size_x; cx++) | |
|         filter_hint[ colour_component ][ cy ][ cx ] | se(v) |
|   additional_extension_flag | u(1) |
| } | |

FIG. 9B

| Value | Description |
|---|---|
| 0 | coefficients of a 2D FIR filter |
| 1 | coefficients of two 1D FIR filters |
| 2 | cross-correlation matrix |
| 3 | Reserved |

FIG. 10A

| post_filter_hint( payloadSize ) { | Descriptor |
|---|---|
|   filter_hint_size_y | ue(v) |
|   filter_hint_size_x | ue(v) |
|   filter_hint_type | u(2) |
|   if( filter_hint_type ==3 ) | |
|     across_filter_type | u(2) |
|   for( colour_component=0; colour_component<3; colour_component++) | |
|     for( cy =0; cy<filter_hint_size_y; cy++) | |
|       for( cx =0; cx<filter_hint_size_x; cx++) | |
|         filter_hint[ colour_component ][ cy ][ cx ] | se(v) |
|   additional_extension_flag | u(1) |
| } | |

FIG. 10B

| Value | Description |
|---|---|
| 0 | coefficients of a 2D FIR filter |
| 1 | coefficients of two 1D FIR filters |
| 2 | cross-correlation matrix |
| 3 | across_tile_filter_flag |

FIG. 10C

| Value | Description |
| --- | --- |
| 0 | across tile disable / across slice disable |
| 1 | across tile enable / across slice disable |
| 2 | across tile disable / across slice enable |
| 3 | across tile enable / across slice enable |

FIG. 10D

| post_filter_hint( payloadSize ) { | Descriptor |
| --- | --- |
| ... | |
| if( filter_hint_type ==3 ) { | |
|   across_tile_filter_flag | u(1) |
|   if( across_tile_filter_flag ) | |
|     across_slice_filter_flag | u(1) |
| } | |
| ... | |
| } | |

FIG. 10E

| post_filter_hint( payloadSize ) { | Descriptor |
| --- | --- |
| ... | |
| if( filter_hint_type ==3 ) { | |
|   across_filter_type | u(2) |
|   colour_filter_flag | u(1) |
| } | |
| for( colour_component=0; colour_component<N; colour_component++) | |
|   for( cy =0; cy<filter_hint_size_y; cy++) | |
|     ... | |
| } | |

FIG. 11A

| post_filter_hint( payloadSize ) { | Descriptor |
| --- | --- |
| ... | |
| additional_extension_flag | u(1) |
| if( additional_extension_flag ) { | |
|   across_filter_type | u(2) |
|   beta_offset_div2 | se(V) |
|   tc_offset_div2 | se(V) |
| } | |
| } | |

FIG. 11B

| Value | Description |
|---|---|
| 0 | across tile disable / across slice disable |
| 1 | across tile enable / across slice disable |
| 2 | across tile disable / across slice enable |
| 3 | across tile enable / across slice enable |

FIG. 11C

| post_filter_hint( payloadSize ) { | Descriptor |
|---|---|
| ... | |
| additional_extension_flag | u(1) |
| if( additional_extension_flag ) { | |
|   across_tile_filter_flag | u(1) |
|   if( across_tile_filter_flag ) | |
|     across_slice_filter_flag | u(1) |
|   beta_offset_div2 | se(V) |
|   tc_offset_div2 | se(V) |
|   if( across_tile_filter_flag ) { | |
|     num_tile_columns_minus1 | ue(V) |
|     num_tile_rows_minus1 | ue(V) |
|     for( j=0; j<num_tile_rows_minus1; j++ ) | |
|      for( i=0; i<num_tile_columns_minus1; i++ ) | |
|       if( i !=num_tile_columns_minus1 ) | |
|        loop_filter_v_across_tiles_enabled_flag[ i ][ j ] | u(1) |
|       if( j !=num_tile_rows_minus1 ) | |
|        loop_filter_h_across_tiles_enabled_flag[ i ][ j ] | u(1) |
|     } | |
|   } | |
| } | |

FIG. 21

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 32
| Corresponding standard | Driving frequency |
|---|---|
| MPEG-4 AVC | 500 MHz |
| MPEG-2 | 350 MHz |
| ⋮ | ⋮ |
FIG. 33A
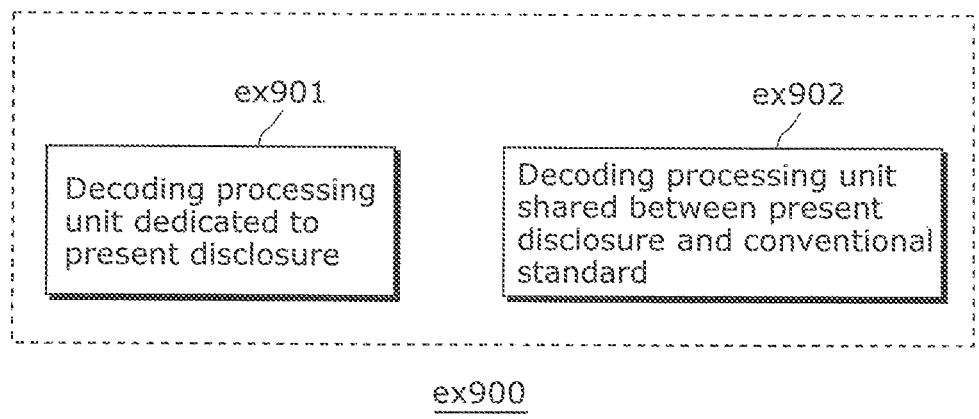
FIG. 33B
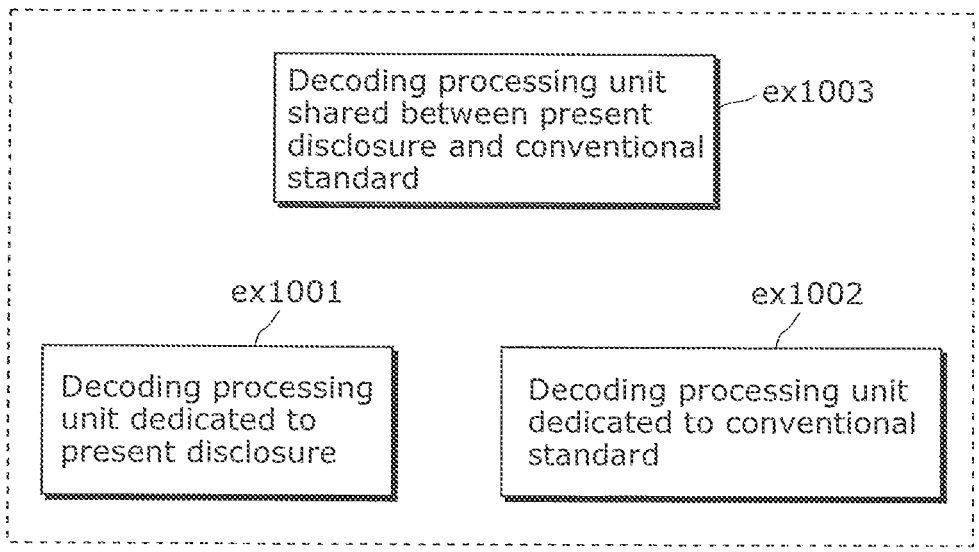

IMAGE ENCODING METHOD, IMAGE DECODING METHOD, IMAGE ENCODING DEVICE, IMAGE DECODING DEVICE, AND IMAGE ENCODING/DECODING DEVICE

FIELD

The present disclosure relates to an encoding method and a decoding method for increasing efficiency in parallel operation on an image signal.

BACKGROUND

In the conventional image encoding methods (for example, see Non-patent Literature 1) represented by the ITU-T standards denoted as H.26x and the ISO/IEC standards denoted as MPEG-x, it is possible to divide a picture corresponding to an image signal into units called slices and encode the whole picture on a slice-by-slice basis according to a raster scan order on the whole picture.

The HEVC standard (for example, see Non-patent Literature 2) that has been standardized as a new standard introduces a tile format which makes it possible to divide a picture corresponding to an image signal into tiles having a rectangular shape, and perform a raster scan within each of the tiles resulting from the division. This tile format allows division of the picture in the vertical direction, and thus can reduce the capacity of a memory for pixel lines.

For example, FIG. 1 shows an example where a picture is divided also in the vertical direction into tiles enclosed by solid lines. The areas enclosed by broken lines are sub-areas further divided as slices from the tiles in the middle of a raster scan. FIG. 1 shows a pattern in which each of the tile boundaries is not across any slice boundary, and FIG. 2 shows a pattern in which each of the slice boundaries is not across any tile boundary.

CITATION LIST

Non Patent Literature

[NPL 1]
ISO/IEC 14496-10 "MPEG-4 Part 10 Advanced Video Coding"
[NPL 2]
Joint Collaborative Team on Video Coding (JCT-VC) of ITU-T SG16 WP3 and ISO/IEC JTC1/SC29/WG11 7th Meeting: Geneva, CH,-21-30 November, 2011, JCTVC-G1103, "High Efficiency Video Coding (HEVC) text specification Working Draft5", http://phenix.itsudparis.eu/jct/doc_end_user/documents/7_Geneva/wg11/JCTVC-G1103-v12.zip

SUMMARY

Technical Problem

However, the aforementioned conventional method causes distortion at processing boundaries when areas divided as tiles or slices are processed in parallel. To suppress such distortion, boundaries are subjected to filtering which requires additional processes and memory.

The present disclosure provides methods for realizing an encoding device which suppress a boundary distortion according to an input image signal and an area resulting from division, and a decoding device capable of decoding a stream with less distortion.

Solution to Problem

According to an aspect of the present disclosure, an image decoding method for decoding an image from a bitstream on a per block basis, includes: predicting a current block included in the image using a reference block different from the current block, to generate a prediction block; and generating a reconstructed block using the prediction block, wherein the generating includes: first filtering for filtering a boundary between the reconstructed block and a decoded neighboring block neighboring the current block, using a first filter strength which is set using first prediction information used in the prediction of the current block and second prediction information used in prediction of the decoded neighboring block; second filtering for filtering the boundary using a second filter strength which is set without using the first prediction information and the second prediction information; and switching whether or not to execute the second filtering, based on the boundary, wherein the first filtering is in-loop filtering in a loop in which a filtered reconstructed block is used as a reference block for another block, and the second filtering is post filtering outside the loop.

These general and specific aspects may be implemented using a system, a device, an integrated circuit, a computer program, or a computer-readable recording medium such as a CD-ROM, or any combination of systems, devices, integrated circuits, computer programs, or computer-readable recording media.

Advantageous Effects

According to an aspect of the present disclosure, an encoder side can switch between filters one of which is to be applied to a current area boundary, based on information included in header information. In this way, it is possible to generate a bitstream with an enhanced image quality. Here, no filtered image is used as a prediction image. Thus, it is possible to perform filtering in parallel with other processes, which makes it possible to accelerate encoding and decoding processes.

In addition, with the information included in the header information, it is possible to suppress boundary distortions in a decoded image. In this way, this embodiment provides a further increased encoding efficiency and thus has a highly practical value.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9A is a diagram illustrating header information defining processes which are performed outside a conventional decoding loop.

FIG. 9B is a table indicating the meaning of each of the values of conventional filter_hint_type.

FIG. 10A is a diagram illustrating an example of a data structure of information indicating a boundary distortion removing method in Embodiment 2.

FIG. 10B is a table indicating an exemplary meaning of each of the values of filter_hint_type in Embodiment 2.

FIG. 10C is a diagram illustrating an example of the meaning of each of the values of filter_hint_type in Embodiment 2.

FIG. 10D is a diagram illustrating another example of a data structure of information indicating a boundary distortion removing method in Embodiment 2.

FIG. 10E is a diagram illustrating another example of a data structure of information indicating a boundary distortion removing method in Embodiment 2.

FIG. 11A is a diagram illustrating an example of a data structure of information indicating a boundary distortion removing method in the case where an extension flag is used in Embodiment 2.

FIG. 11B is a diagram illustrating an example of the meaning of each of the values of across_filter_type in Embodiment 2.

FIG. 11C is a diagram illustrating another example of a data structure of information indicating a boundary distortion removing method in the case where an extension_flag is used in Embodiment 2.

FIG. 21 illustrates a structure of multiplexed data.

FIG. 32 shows an example of a look-up table in which video data standards are associated with driving frequencies.

FIG. 33A is a diagram showing an example of a configuration for sharing a module of a signal processing unit.

FIG. 33B is a diagram showing another example of a configuration for sharing a module of the signal processing unit.

DESCRIPTION OF EMBODIMENTS

Outline of the Present Disclosure

Figure 1:
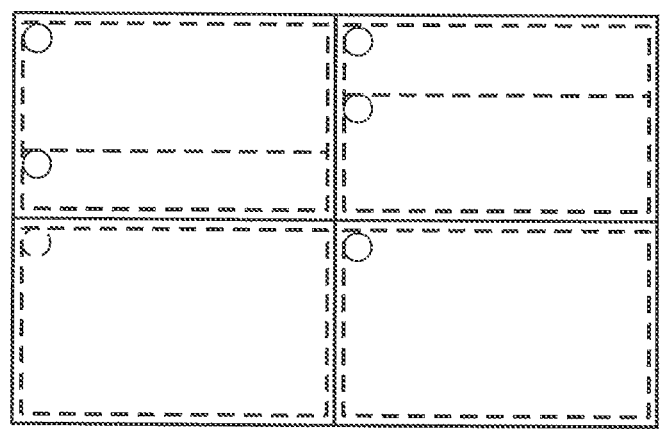
FIG. 1 is a diagram illustrating an example of relationships between tiles and slices.

An image decoding method according to an aspect of the present disclosure is an image decoding method for decoding a bitstream having information for dividing a spatial area of an image, the image decoding method including: obtaining, from the bitstream, a coefficient and a parameter necessary for decoding, and generating a difference value by performing inverse quantization and inverse transform on the coefficient; performing prediction using an encoded pixel value; generating a decoded image by adding a result of the prediction and the difference value; filtering pixel values of the decoded image; and switching between methods for the filtering, wherein, in the switching, a switch is made between the methods for the filtering, based on the information for dividing the spatial area.

For example, in the performing of prediction, the prediction may be performed without using a result of the filtering.

For example, in the switching, information indicating the switch between the methods for the filtering may further be obtained from the bitstream.

For example, in the switching, the switch between the methods for the filtering may be made on a per division boundary basis.

For example, in the switching, the switch may be made to a different one of the filtering methods, depending on a horizontal direction or a vertical direction of a division boundary.

For example, predetermined filtering performed on a division boundary may be only filtering for reducing block noise.

For example, predetermined filtering performed on a division boundary may include filtering using only pixel information, in addition to filtering identical to filtering performed on a picture boundary.

An image encoding method according to an aspect of the present disclosure is an image encoding method for dividing an image signal into spatial areas and encoding each of the spatial areas, the image encoding method including: generating a prediction signal of the image signal; obtaining a difference signal between the image signal and the prediction signal; transforming and quantizing the difference signal to obtain transform coefficient information; performing variable length encoding on the transform coefficient information; and performing local decoding using the transform coefficient information to generate a reconstructed image, wherein, in the performing of variable length encoding, information indicating a switch between methods for filtering is recorded onto a bitstream, based on information for dividing the spatial area of the reconstructed image at a decoder side.

For example, the methods for filtering may be of one or more kinds, and methods for predetermined filtering to be performed on a division boundary of the reconstructed image may include a skip of filtering.

For example, predetermined filtering to be performed on a division boundary may be of one or more kinds, and in the performing of variable length encoding, when a video signal is across a division boundary, information indicating that no filtering is performed on the division boundary may be recorded onto the bitstream.

For example, in the performing of variable length encoding, information indicating that predetermined filtering to be performed on the division boundary is only filtering for reducing block noise may be recorded onto the bitstream.

For example, in the performing of variable length encoding, information indicating that filtering for a division boundary of a colour signal is differentiated from filtering for a division boundary of an other signal may be recorded onto the bitstream.

These general and specific aspects may be implemented using a system, a device, an integrated circuit, a computer program, or a computer-readable recording medium such as a CD-ROM, or any combination of systems, devices, integrated circuits, computer programs, or computer-readable recording media.

Hereinafter, Embodiments are described with reference to the drawings.

It is to be noted that each of the embodiments described below indicates a general or specific example. The numerical values, shapes, materials, elements, the arrangement and connection of the elements, steps, the processing order of the steps etc. indicated in the following exemplary embodiments are mere examples, and therefore do not limit the scope of the present disclosure. Therefore, among the structural elements in the following embodiments, elements not recited in any one of the independent claims which define the most generic concept are described as arbitrary elements.

Embodiment 1

Embodiment 1 describes how the decoding device capable of performing the parallel decoding performs the method of decoding a bitstream in parallel and removing a boundary distortion which occurs when the image signals processed in parallel are reconstructed.

First, a description is given of a case of a structure in which a slice header is always included in the starting point of each of tile boundaries as illustrated in FIG. 1. Since tiles can be obtained by evenly dividing a picture into rectangular shapes, in an example case of an image which has a short top boundary and is large in the horizontal direction (an image having a resolution called 4K or 8K), it is advantageously possible to reduce the required memory size, it is easy to evenly divide the pixel values into tile areas, and therefore it is possible to perform parallel processing. For this reason, it is important to start such parallel decoding with the starting points of tiles in order to efficiently perform the parallel decoding. In this case, the boundaries that should be the targets from which distortion is removed are slice boundaries.

Figure 2:
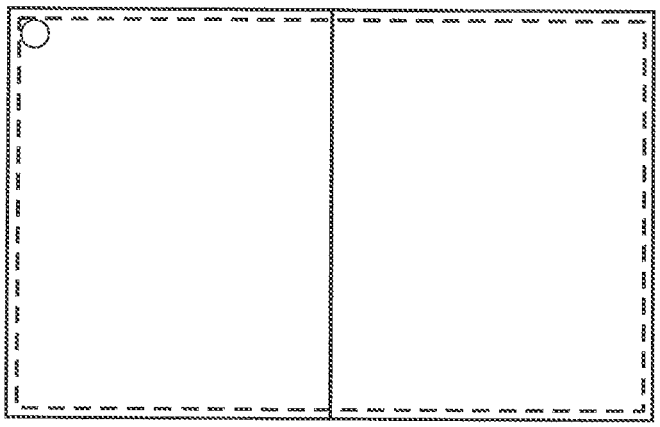
FIG. 2 is a diagram illustrating an example of relationships between tiles and slices.

Next, a description is given of a case of a structure in which a plurality of tiles are included in a slice as illustrated in FIG. 2. Since tiles can be obtained by evenly dividing a picture into rectangular shapes, in an example case of an image which has a short top boundary and is large in the horizontal direction (an image having a resolution called 4K or 8K), it is advantageously possible to reduce the required memory size, it is easy to evenly divide the pixel values into tile areas, and therefore it is possible to perform parallel processing. In this case, the boundaries that should be the targets from which distortion is removed are tile boundaries.

Figure 3A:
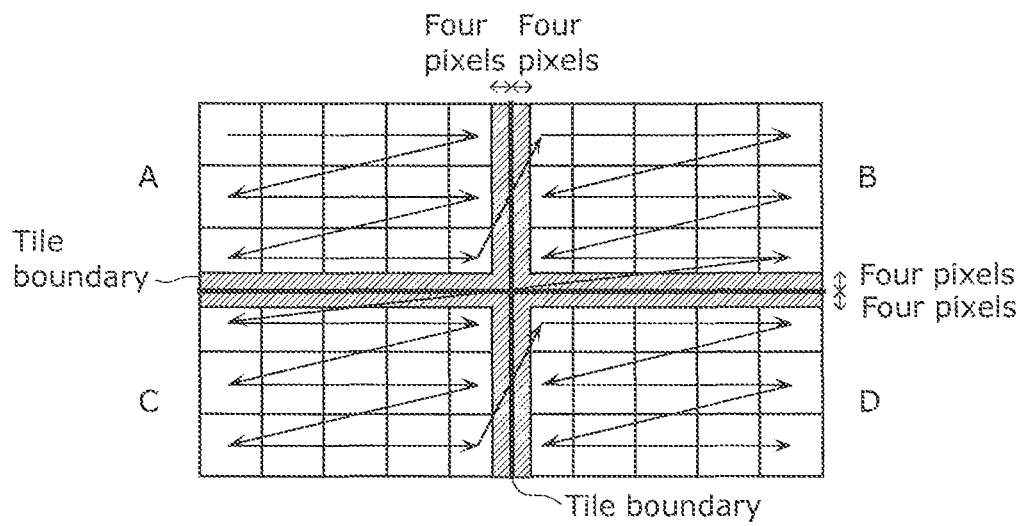
FIG. 3A is a diagram for explaining a processing order of a plurality of areas and pixels around boundaries.
Figure 3B:
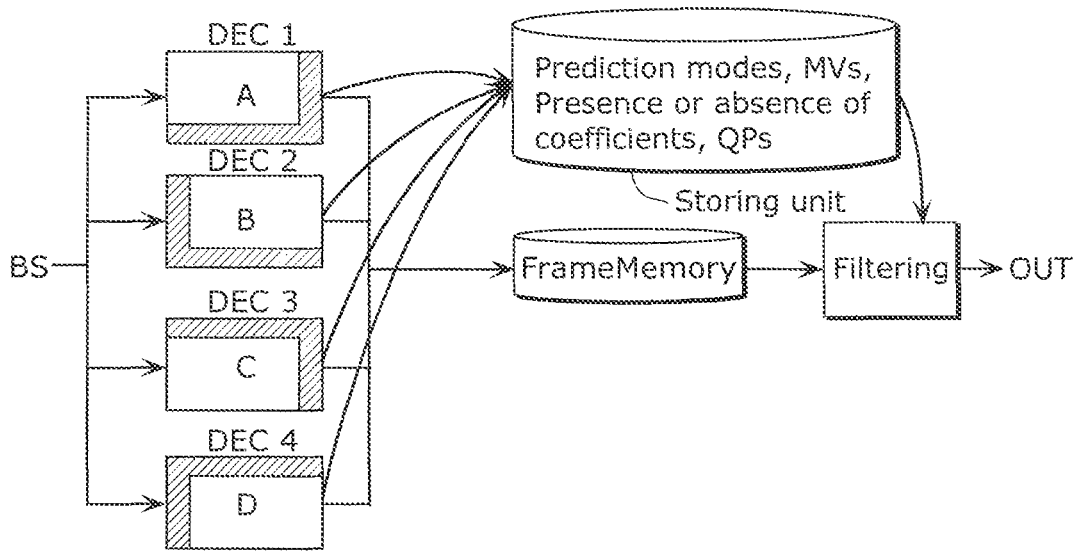
FIG. 3B is a diagram illustrating an example of a conventional structure in the case of decoding a plurality of areas in parallel.
Figure 3C:
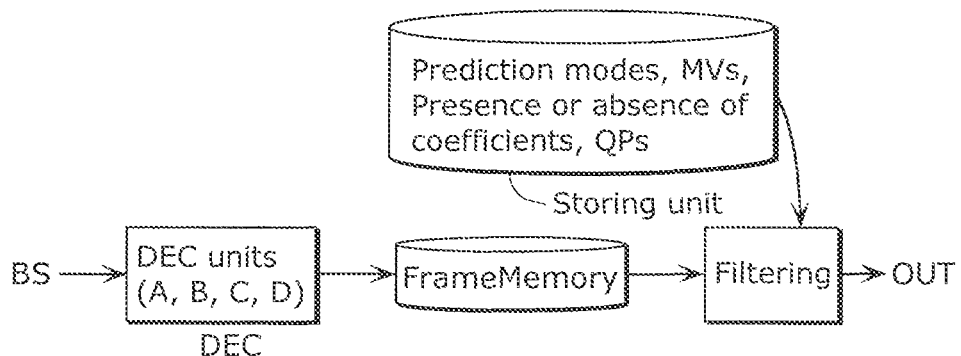
FIG. 3C is a diagram illustrating an example of a conventional structure in the case of decoding a plurality of areas in parallel.
Figure 4:
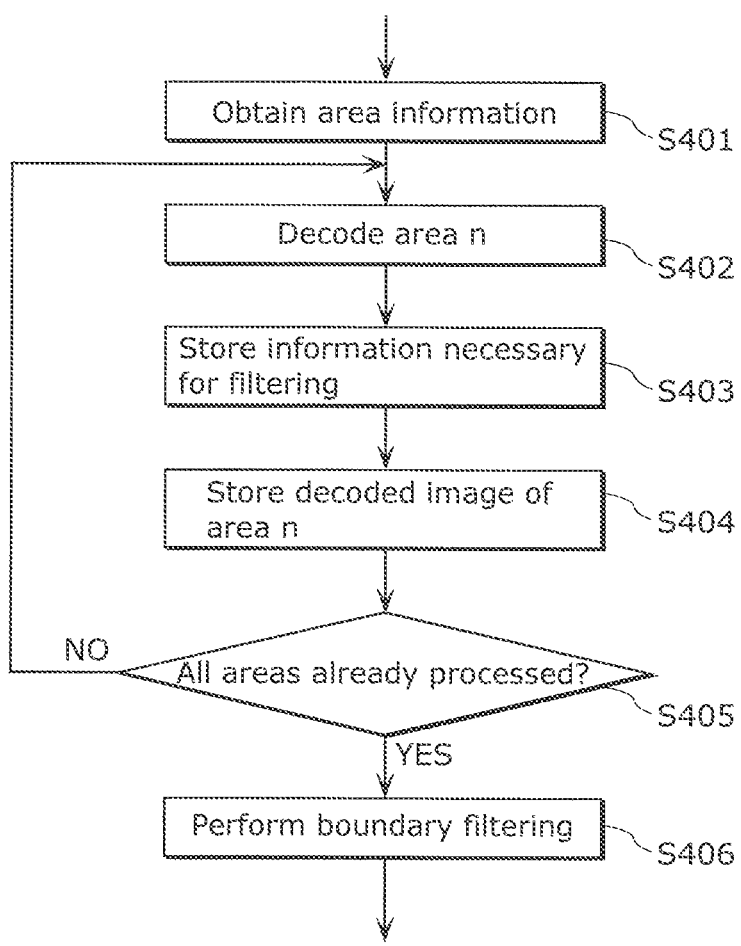
FIG. 4 is a flowchart showing examples of conventional filtering processes.

FIGS. 3A to 3C are schematic diagrams for explaining a conventional decoding method in the case where a video having the structure in FIG. 1 is decoded. FIG. 3A is an illustration for explaining in detail the order of processing the areas A, B, C, and D, and the pixels located at the boundary areas. The boundary areas (4 pixels×4 pixels) illustrated here is an area on which a boundary distortion removal process is performed. FIG. 3B is a block diagram illustrating an example of a conventional structure of a decoding device in the case where the areas A, B, C, and D are decoded in parallel. This decoding device includes decoders DEC 1, DEC 2, DEC 3, and DEC 4, a frame memory FrameMemory for temporality storing results of decoding, a storage unit for storing information (such as prediction modes, motion vectors (MVs), presence or absence of coefficients, quantization parameters QP) necessary for filtering, and a filtering unit. Operations are described with reference to FIG. 4.

A bitstream BS is obtained, and area information is obtained therefrom (S401). The area n is decoded by a corresponding one of the decoders based on area information (S402), and filtering information related to a corresponding one of hatched areas (a corresponding tile boundary area) is stored in the storage unit (S403). On the other hand, pixel information of the area n is stored in the frame memory for temporary storage (S404). When not all the areas are yet decoded (NO in S405), decoding for the remaining area(s) is continued. On the other hand, when all the areas are already decoded (YES in S405), the filtering unit filters the pixels obtained from the frame memory based on the information obtained from the storage unit (S406), and outputs a decoded image OUT.

Here, the decoders DECs 1 to 4 may be realized as a single DEC processing unit. The structure in this example is FIG. 3C. The results are the same in both the cases. The storage unit and the filtering unit perform the same processes as performed by the equivalent elements in FIG. 3B, and thus no detailed descriptions are repeated.

In the above-described conventional structure, a filter process using information in the storage unit is further required after the decoding processes performed by the DECs 1 to 4, and a filtered video is also required when generating a prediction image for a next frame. Thus, high-speed processing is required, which necessitates improvements such as an increase in the circuit scale and an increase in operation frequency.

The decoding method in this embodiment is different in the point of not using, for prediction, any video subjected to a distortion removal process.

Figure 5:
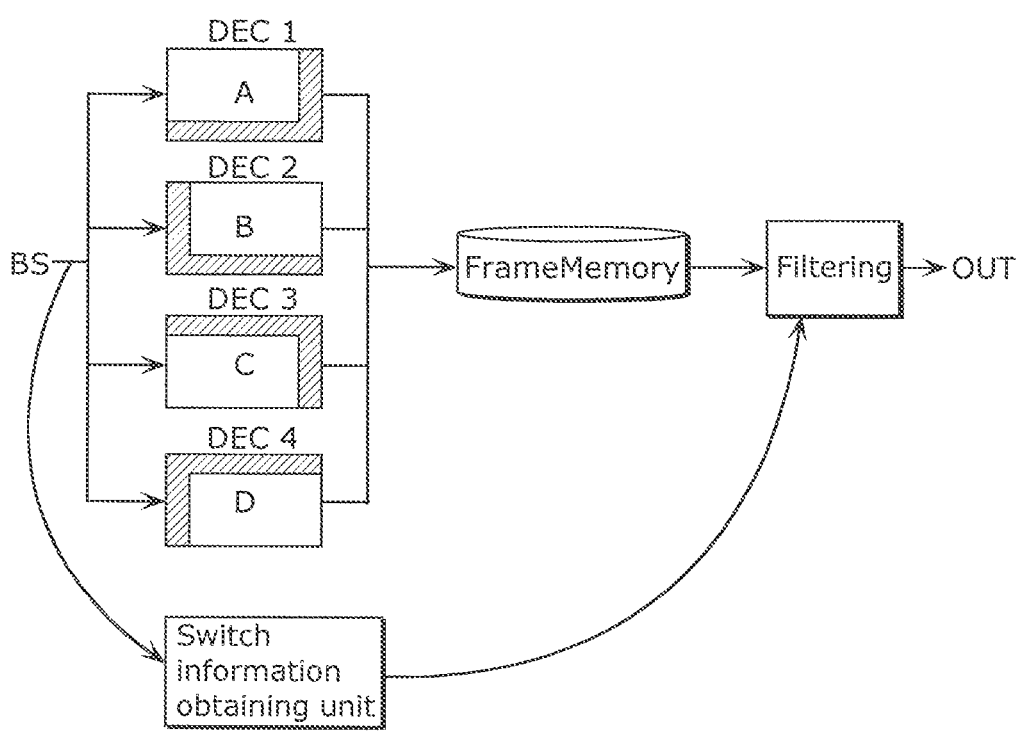
FIG. 5 is a block diagram illustrating an example of a structure of an image decoding device according to Embodiment 1.
Figure 6:
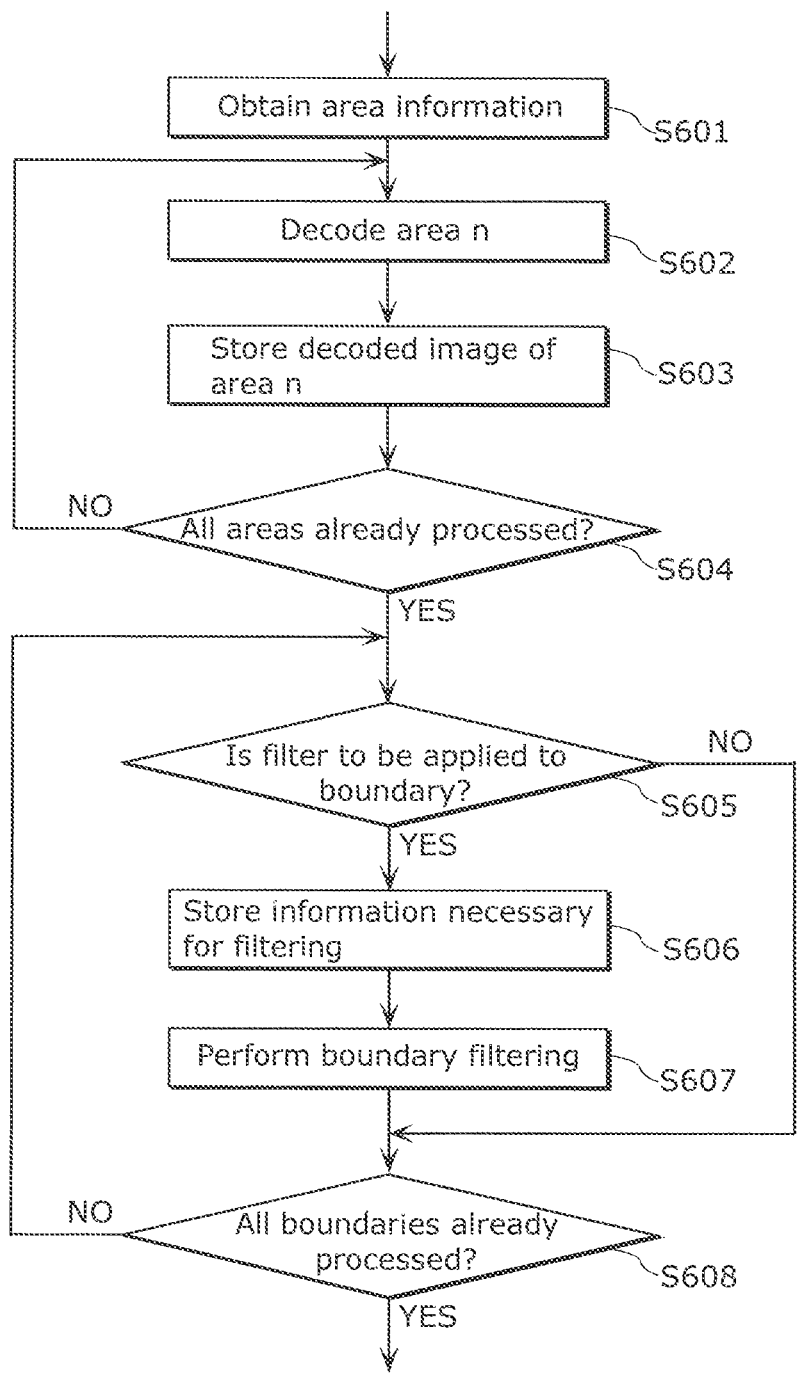
FIG. 6 is a flowchart illustrating an example of operations by the image decoding device according to Embodiment 1.

FIG. 5 is a block diagram illustrating an example of a structure of an image decoding device according to Embodiment 1. This decoding device includes decoders DEC 1, DEC 2, DEC 3, and DEC 4, a frame memory FrameMemory for temporality storing results of decoding, a switch information obtaining unit which switches filtering processes according to bitstream information. A flow of operations performed by this structure is described with reference to FIG. 6.

A bitstream BS is obtained, and area information (information for dividing a spatial area) is obtained therefrom (S601). The area n is decoded by a corresponding one of the decoders based on area information (S602), and pixel information about the area n is stored in the frame memory for temporary storage (S603). When not all the areas are yet decoded (NO in S604), decoding for the remaining area(s) is continued. On the other hand, when all the areas are already decoded (YES in S604), the decoding image information in the frame memory is used for prediction for a next frame etc., a transition is made to a next process for the next frame in the decoding. On the other hand, as a step of generating an output image, the switch information obtaining unit next determines whether or not to apply a filter on a target boundary based on the switch information (information indicating a switch between filtering methods) obtained from the bitstream BS (S605). When a filter is applied (YES in S605), the filtering unit filters the pixels obtained from the frame memory, based on the filter information (or predetermined strength information etc.) obtained from the bitstream (S607). On the other hand, when no boundary filter is applied (NO in S605), no filtering is performed. When not all the boundaries are yet subjected to boundary processing (execution/skip of filtering) (NO in S608), next boundary processing is performed. When all the boundaries are already subjected to boundary processing (YES in S608), a decoded image OUT is output.

In this way, it is possible to eliminate the need to mount the storage unit for storing information of pixels around each boundary, to reduce the scale of a circuit. With this structure, it is possible to decode filter switch information (strength switch information) only when a filter is applied, reducing the amount of information necessary for decoding, and to apply a filter on each boundary to be filtered with consideration of image quality. In addition, unfiltered content in the frame memory is used for prediction, which allows, for a next frame, a decoding process to be started, resulting in an increase in operation speed.

Figure 7:
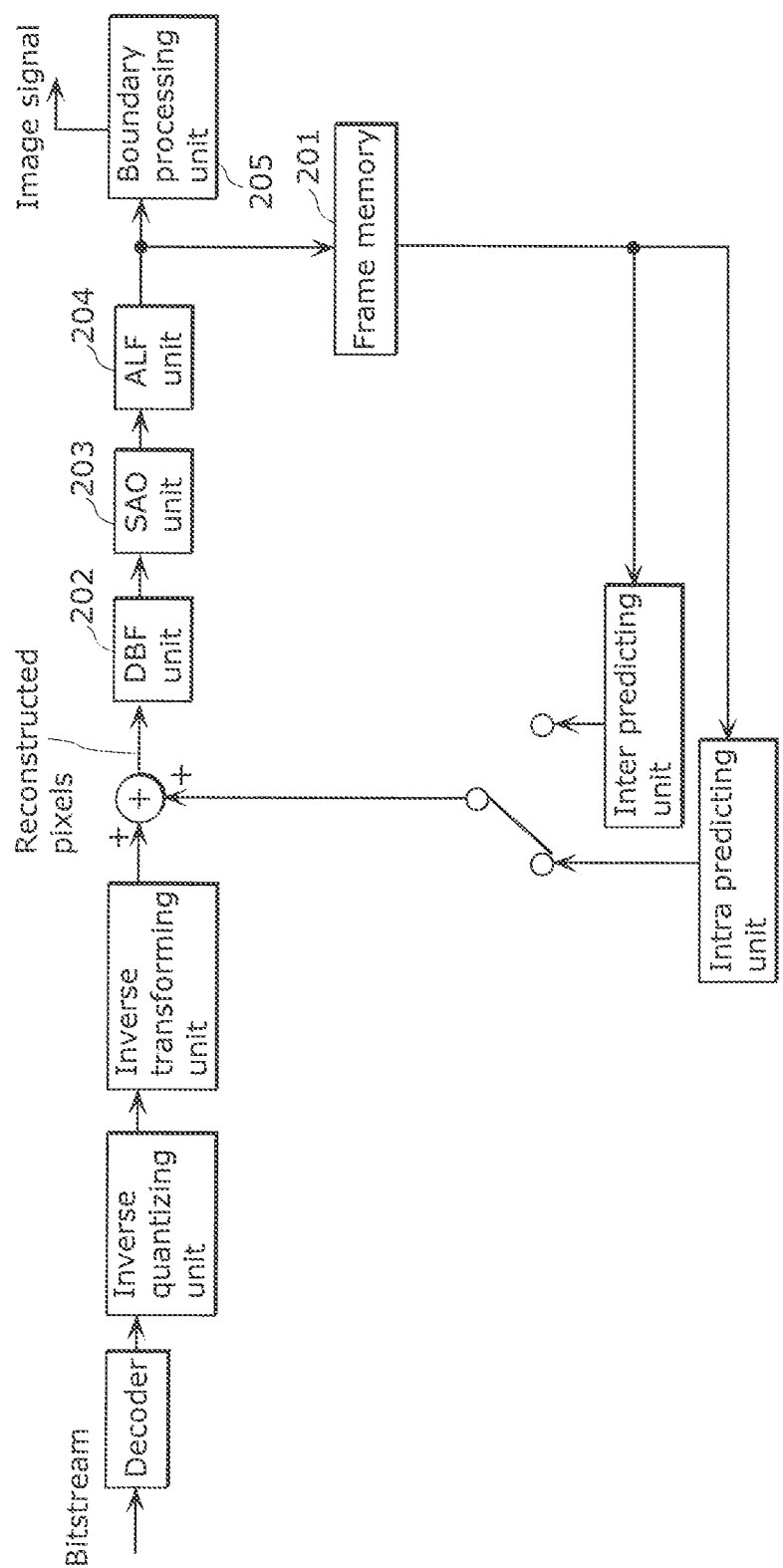
FIG. 7 is a block diagram illustrating an example of a structure of an image decoding device according to Embodiment 1.

FIG. 7 is a block diagram illustrating a structure obtained by adding a boundary processing unit 205 to a conventional decoding device. An input bitstream is divided into processing units, and the processing units are subjected to decoding, inverse quantization, and inverse transform. Prediction pixel values in each processing unit are calculated by either (i) an intra predicting unit in the case of intra encoding with reference to pixels stored in the frame memory 201, specifically, pixels of the picture including a target block or pixels of a picture not including the target block, or (ii) an inter predicting unit in the case of inter encoding. The prediction pixel values are added to difference values obtained through inverse transform, resulting in reconstructed pixels. These reconstructed pixels are filtered in a DBF unit 202, a SAO unit 203, and an ALF unit 204, and then are stored in a frame memory 201 and are output. At this time, the Deblocking filter (DBF), the Sample Adaptive Offset (SAO), and the Adaptive Loop Filter (ALF) may not execute their processing.

Figure 8:
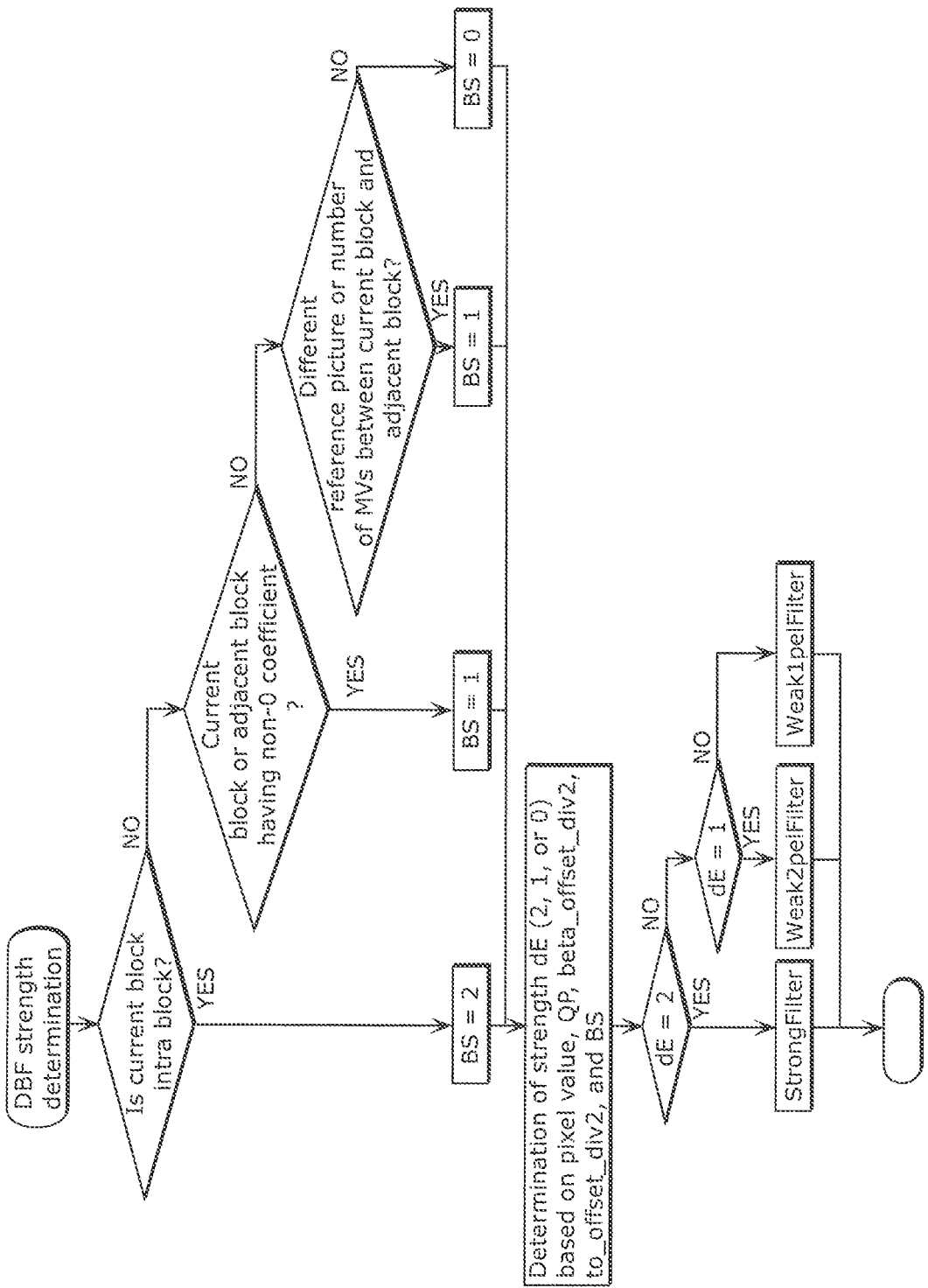
FIG. 8 is a flowchart illustrating filter strength determination processes in Embodiment 1.

Here, the DBF unit 202 executes a DBF process defined in the "Deblocking filter process" in section 8.7 of Non-patent Literature 1 or a process defined in the "Deblocking filter process" in section 8.7.1 in the HEVC (Non-patent Literature 2). The DBF process requires not only processing target pixels but also encoding modes of blocks to which the pixels belong, motion vectors (MVs), presence or absence of coefficients in quantization, quantization parameters (QPs) etc. as information in filtering, and selects and applies one of filter strengths from three levels of Strong, Weak2pel, and Weak1pel. FIG. 8 illustrates a filter strength determination flow in DBF processes.

In addition, the SAO unit 203 executes a SAO process defined in "Sample Adaptive Offset process" in section 8.7.2 in the HEVC (Non-patent Literature 2). In addition, the ALF unit 204 executes an ALF process defined in the "Adaptive Loop Filter process" in section 8.7.2. The SAO processing does not require information such as encoding modes etc. of blocks to which target pixels belong, but requires, as information in processing, SAO offset information about the positions of the target pixels and the pixels neighboring to the target pixels. The boundary processing unit 205 in this embodiment rewrites only images to be output separately from decoded videos in the frame memory 201. Here, the filter switch information obtained from the bitstream is separately input from the bitstream.

In this way, the image decoding device and the image decoding method according to this embodiment make it possible to perform decoding correctly.

This structure makes it possible to control filtering processes suitably for videos, and thus to thereby suppress decrease in the image quality.

Embodiment 2

Embodiment 2 describes a data structure of information indicating a boundary distortion removing method. First, FIG. 9A illustrates header information defining processes performed outside a decoding loop. The header information is referred to as supplemental information set (SEI) defined irrespective of conventional boundaries. It is assumed that these parameters indicate operations conforming to the method described in Non-patent Literature 2 unless otherwise explained. FIG. 9B is a table indicating the meaning of each of values (Value) of filter_hint_type in the structure in FIG. 9A. In the case where the value is 3, it is indicated here that the value is reserved as a reserved value for future use. Here, cases of the other values are the same as in Non-patent Literature 2.

With reference to FIG. 10A, a description is given of a data structure of information indicating the boundary distortion removing method in this embodiment.

FIG. 10A is an example of information indicating the boundary distortion removing method in the case of maintaining the conventional data structure with extension using the above-described reserved value for boundary filtering. The parameters illustrated in FIG. 9A and for which no specific descriptions are given indicate operations conforming to the method described in Non-patent Literature 2 unless otherwise explained.

Here, FIG. 10B indicates the meaning of each of the values of conventional filter_hint_type defined newly. In the case where the value of filter_hint_type is 3, that is, the SEI information indicates a filter for a boundary between tiles or slices, a parameter indicating which one of a tile boundary and a slice boundary each having a value of across_filter_type is to be filtered is encoded and/or decoded. This can be defined, for example, as a combination indicated in FIG. 10C. When the value of across_filter_type is 0, the zero value indicates that no filter is applied to the boundaries, and is not normally used (for this reason, the value may be used as a reserved value for future extension).

The arrangement of the values 0 to 3 does not have any special meaning, and thus any other arrangement is possible. For example, the structure in FIG. 10D is possible. In this case, which one of the slice boundary and the tile boundary is to be subjected to filtering is switched by either across_tile_filter_flag or across_slice_filter_flag. In addition, a relationship in which when one of the values is 0, the other value is 1 is known (from the value of filter_hint_type that is a superior parameter indicating a boundary filter), one of the flags may be omitted. It is also good to arrange the flags in parallel instead of placing an if condition, with consideration of high-speed decoding. Here, the order of the parameters may be reversed.

In addition, in the conventional data structure, it is possible to transmit three kinds of filters depending on colour_component that is colour information. As for boundary filtering, a less number of areas are to be filtered when the value of the above-described filter_hint_type is not 3, compared to the case in which all of the pixels are filtered. Here, any low-pass filter for removing boundary distortion is possible. Thus, in many cases, it is not advantageous to change a filter on a colour information item basis because the amount of header information is increased.

For this reason, a data structure as illustrated in FIG. 10E may be employed. This is an example where the number N of filters is modified based on colour_filter_flag. When this flag is not defined, the number of filters is defined as N=3.

Here, a different filter is defined for each colour assuming that N is 3 when the value of colour_filter_flag is 1, while the same filter is defined for all of the filters assuming that N is 1 when the value of colour_filter_flag is 0. Alternatively, the amount of filter information may be reduced by switching between two kinds of signals that are a luminance signal and a colour signal assuming that N is 2 when the value of colour_filter_flag is 1, or colour_filter_flag may be defined as a value of N instead of the flag. A feature here is to define a structure for controlling the number of filters.

In each of FIGS. 10A to 10E, a case where a reserved value of filter_hint_type is used. However, the number of filters may be defined using another kind of extension flag called additional_extension_flag. An example in this case is described with reference to FIGS. 11A to 11C. Here, a method for transmitting filter coefficients defined in FIGS. 10A to 10E may be defined in each of cases where additional_extension_flag is 1. This case can be explained in the same manner as the descriptions given with reference to FIGS. 10A to 10E, and thus the same descriptions are not repeated. In FIG. 11A, when an extension flag additional_extension_flag is 1, the above-described across_filter_type may be defined as in FIG. 11B (as a separate flag as in the cases illustrated in FIGS. 10A to 10E), and parameters beta_offset_div2 and tc_offset_div2 each indicating a deblocking filter strength may be encoded. As for the definitions of these parameters are the same as in Non-patent Literature 1. Here, quantization parameters for use in determination of deblocking filter strengths may be representative values of tiles and slices, or QP values for deblocking filtering may be newly encoded.

FIG. 11C is an example indicating whether or not to apply a filter to each tile boundary when tile boundary filtering is performed. Specifically, this example indicates that a filter is applied to a right neighbouring boundary when a flag loop_filter_v_across_tiles_enabled_flag indicates 1, and no filter is applied thereto when the flag indicates 0. Likewise, this example further indicates that a filter is applied to a neighbouring boundary below when a flag loop_filter_h_across_tiles_enabled_flag indicates 1, and no filter is applied thereto when the flag indicates 0.

By encoding information indicating whether or not to apply a filter to each boundary in this way, it is possible to enhance the image quality.

Figure 12:
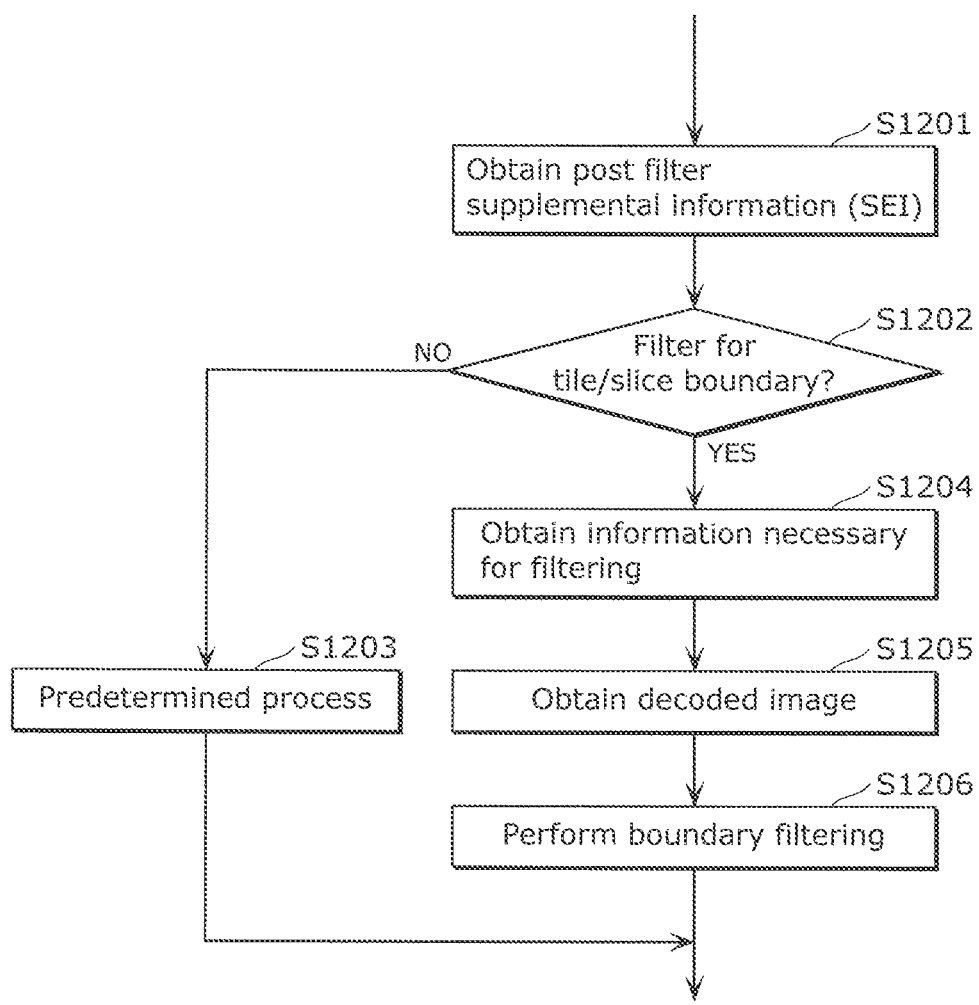
FIG. 12 is a flowchart illustrating an exemplary image decoding method in Embodiment 2.

An operation example according to a decoding method using a data structure in this embodiment is described with reference to FIG. 12.

First, SEI information is obtained (S1201). Next, whether or not the SEI information indicates filtering on tile or slice boundary is determined (S1202). For example, a determining method here is determined based on filter_hint_type in the cases of FIGS. 10A to 10E, and based on additional_extension_flag in the cases of FIGS. 11A to 11C. When the SEI information indicates conventional post filtering on all pixels (No in S1202), filtering is performed according to the method described in Non-patent Literature 1 or the like (S1203). When the SEI information indicates filtering on a tile or slice boundary (YES in S1202), necessary filtering information is obtained (S1204). Here, examples of necessary filtering information includes: the number of filters (a switch according to a colour signal), which one of a tile boundary and a slice boundary is a filtering target, etc. in the cases of FIGS. 10A to 10E; and information for determining a deblocking filtering strength, quantization parameter information, a tile position, a filtering target boundary, etc. in the cases of FIGS. 11A to 11C. After the decoding device obtains a decoded image (S1205), filtering is performed on a boundary based on the obtained information (S1206). In this way, it is possible to enhance the image quality of the decoded image.

FIGS. 10A to 10E and FIGS. 11A to 11C illustrate different sets of necessary filtering information, but the sets are non-limiting examples. A decoded image is subjected to post filtering if the sets are arbitrarily combined, which also enhances the image quality.

Here, as a non-limiting example, some information is defined in addition to already defined post_filter_hint SEI. Alternatively, for example, a reserved value selected under an if condition is extracted and separately defined as post_across_filter SEI. In this way, the usage of SEI can be clearly defined with a clear object defined by an application in the future, which may simplify an encoding device and a decoding device.

In this way, the use of the data structure in this embodiment indicated in the encoding side makes it possible to enhance the image quality of an output image, and furthermore to reduce the circuit scale of the decoding device.

Embodiment 3

Embodiment 3 describes an encoding device which generates a bitstream having the above-described data structure.

Figure 13:
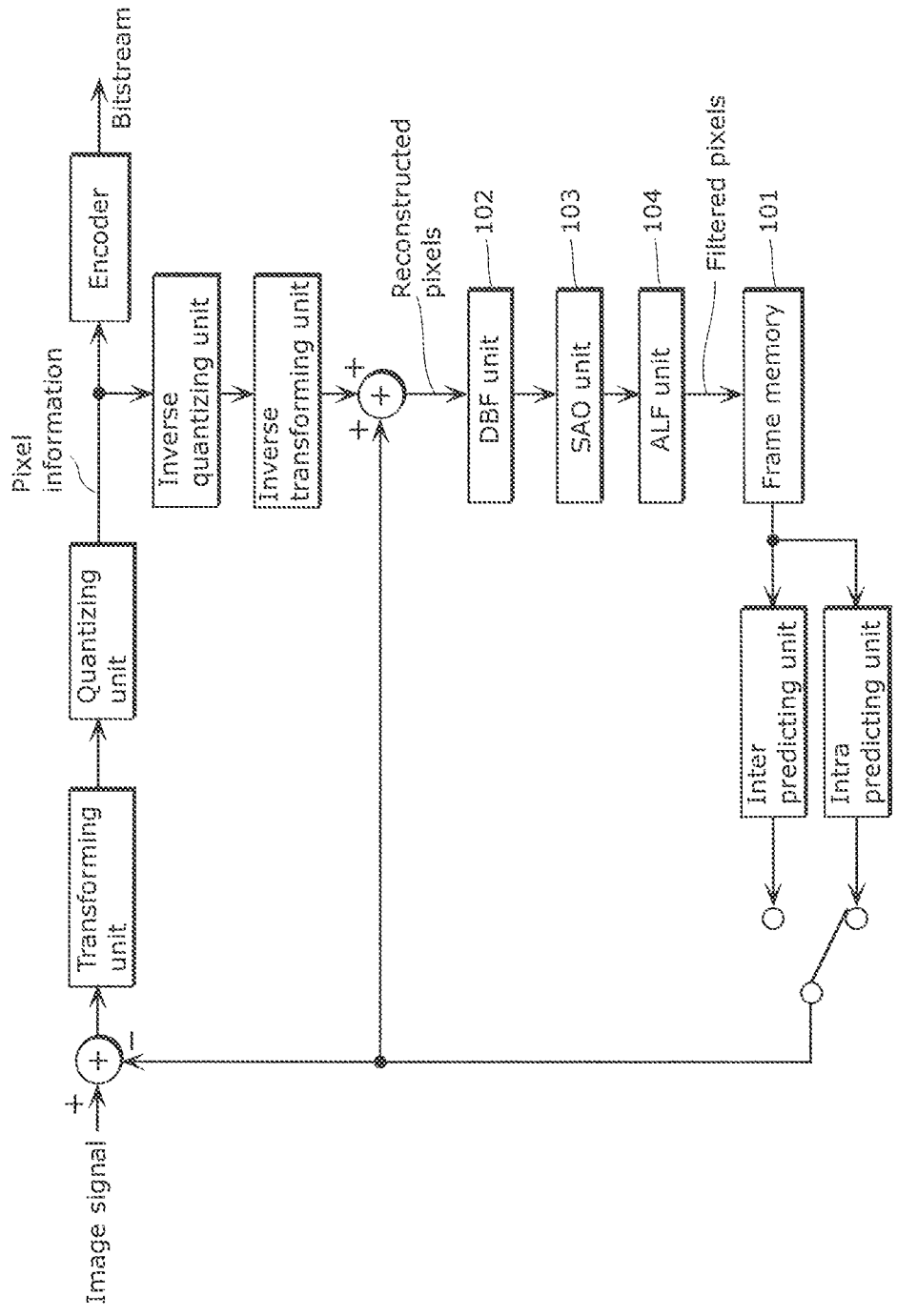
FIG. 13 is a block diagram illustrating an example of a structure of an image encoding device according to Embodiment 3.

FIG. 13 is a block diagram illustrating an example of an encoding device according to Embodiment 3. An input target image signal is processed on a per coding unit basis. Prediction pixel values in each coding unit are calculated by either (i) an intra predicting unit in the case of intra encoding with reference to pixels stored in a frame memory 101, specifically, pixels of the picture including a target block or pixels of a picture not including the target block, or (ii) an inter predicting unit in the case of inter encoding. The differences from the input signals are subjected to transform, quantization, and encoding, resulting in a bitstream. In addition, the quantized coefficients are subjected to inverse quantization and inverse transform, and then added to the difference values, resulting in reconstructed pixels. The reconstructed pixels are then subjected to filtering in a DBF unit 102, an SAO unit 103, and an ALF unit 104, and are stored in a frame memory 101. At this time, processing by the DBF, SAO, and ALF units are not always performed.

Here, the DBF unit 102 as illustrated in FIG. 13 executes a process defined in the "Deblocking filter process" in section 8.7 of Non-patent Literature 2 or a process defined in the "Deblocking filter process" in section 8.7.1 in the HEVC (Non-patent Literature 2). The DBF process requires not only processing target pixels but also encoding modes of blocks to which the pixels belong, motion vectors (MVs), presence or absence of coefficients in quantization, quantization parameters (QPs) etc. as information in filtering, and selects and applies one of filter strengths from three levels of Strong, Weak2pel, and Weak1pel. FIG. 8 illustrates a filter strength determination flow in a conventional DBF process.

In addition, the SAO unit 103 executes a SAO process defined in "Sample Adaptive Offset process" in section 8.7.2 in the HEVC (Non-patent Literature 2), and the ALF unit 104 executes an ALF process defined in "Adaptive Loop Filter process" in the same section 8.7.2. The SAO process does not require information such as encoding modes etc. of blocks to which target pixels belong, but requires, as information in filtering, SAO offset information about the positions of the target pixels and the pixels adjacent to the target pixels. It is to be noted that the encoding side does not need to remove distortion from an image signal with boundary distortions to be stored in the frame memory, and thus does not include any boundary filtering unit. A boundary filtering process in this embodiment is executed by the encoder.

Figure 14:
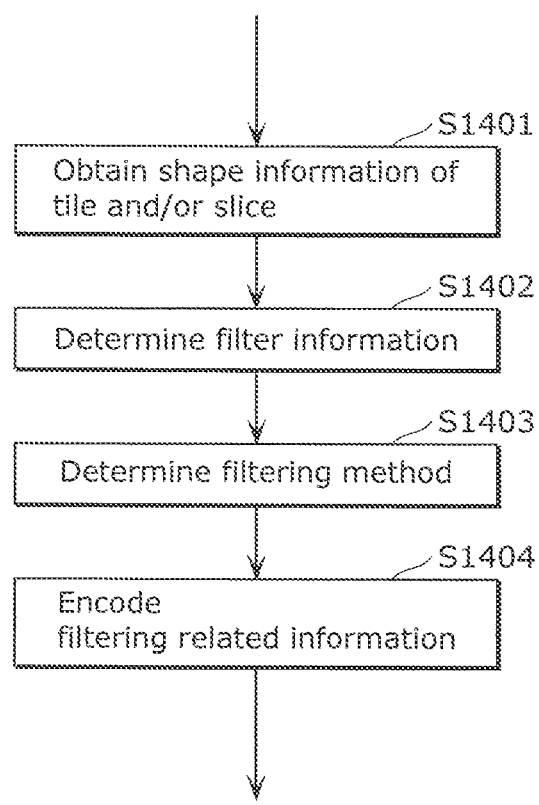
FIG. 14 is a flowchart illustrating an exemplary image encoding method in Embodiment 3.

Here, an operation in a case of determining a filtering process is explained with reference to FIG. 14.

Tile and/or slice shape information determined using a predetermined method is obtained (S1401). Next, among the filter information items indicated in Embodiment 2, one filter information item to be encoded is determined (S1402). In addition, a filtering method (ON/OFF, a filter coefficient, or the like) is determined (S1403), and filtering related information (the above information) is entropy-encoded and recorded as supplemental information in a bitstream by the encoder in FIG. 12.

In order to further enhance the image quality of the decoded image, filter information and filtering method may be determined so that a cost function C becomes smaller, which defined by C=D+λR where D is a difference value between an input image (an original signal before being encoded) and a filtered image, R is the amount of codes necessary for supplemental information, and λ is a Lagrange coefficient.

Here, the cost function C may leave a subjective distortion. Thus, the filter information and the filtering method may be determined mainly in order to increase smoothness of a target area and surrounding pixel areas (make these pixel areas more smooth).

This makes it possible to switch filters depending on videos, and thereby to suppress decrease in the image quality and to enhance the image quality.

The image encoding device and the image decoding device according to one or more aspects have been described above based on the embodiments. However, the present invention is not limited to these embodiments. Various modifications arrived at and made to the embodiments by those skilled in the art and embodiments configured by combining some elements of different embodiments may also be included in the scope of the one or more aspects, without materially departing from the scope of the present disclosure.

Each of the elements in the embodiments may be implemented as exclusive hardware or realized by executing a software program suitable for the element. Each of the elements may be realized by means of a program executing unit such as a CPU or a processor reading a software program recorded on a recording medium such as a hard disk or a semiconductor memory and executing the read software program. Here, the software items for implementing the image decoding device and the image encoding device, or the like in the respective embodiments are programs below.

One program causes a computer to execute an image decoding method according to an aspect of the present disclosure is an image decoding method for decoding a bitstream having information for dividing a spatial area of an image, the image decoding method including: obtaining, from the bitstream, a coefficient and a parameter necessary for decoding, and generating a difference value by performing inverse quantization and inverse transform on the coefficient; performing prediction using an encoded pixel value; generating a decoded image by adding a result of the prediction and the difference value; filtering pixel values of the decoded image; and switching between methods for the filtering, wherein, in the switching, a switch is made between the methods for the filtering, based on the information for dividing the spatial area.

Another program causes a computer to execute an image encoding method according to an aspect of the present disclosure is an image encoding method for dividing an image signal into spatial areas and encoding each of the spatial areas, the image encoding method including: generating a prediction signal of the image signal; obtaining a difference signal between the image signal and the prediction signal; transforming and quantizing the difference signal to obtain transform coefficient information; performing variable length encoding on the transform coefficient information; and performing local decoding using the transform coefficient information to generate a reconstructed image, wherein, in the performing of variable length encoding, information indicating a switch between methods for filtering is recorded onto a bitstream, based on information for dividing the spatial area of the reconstructed image at a decoder side.

Embodiment 4

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 15:
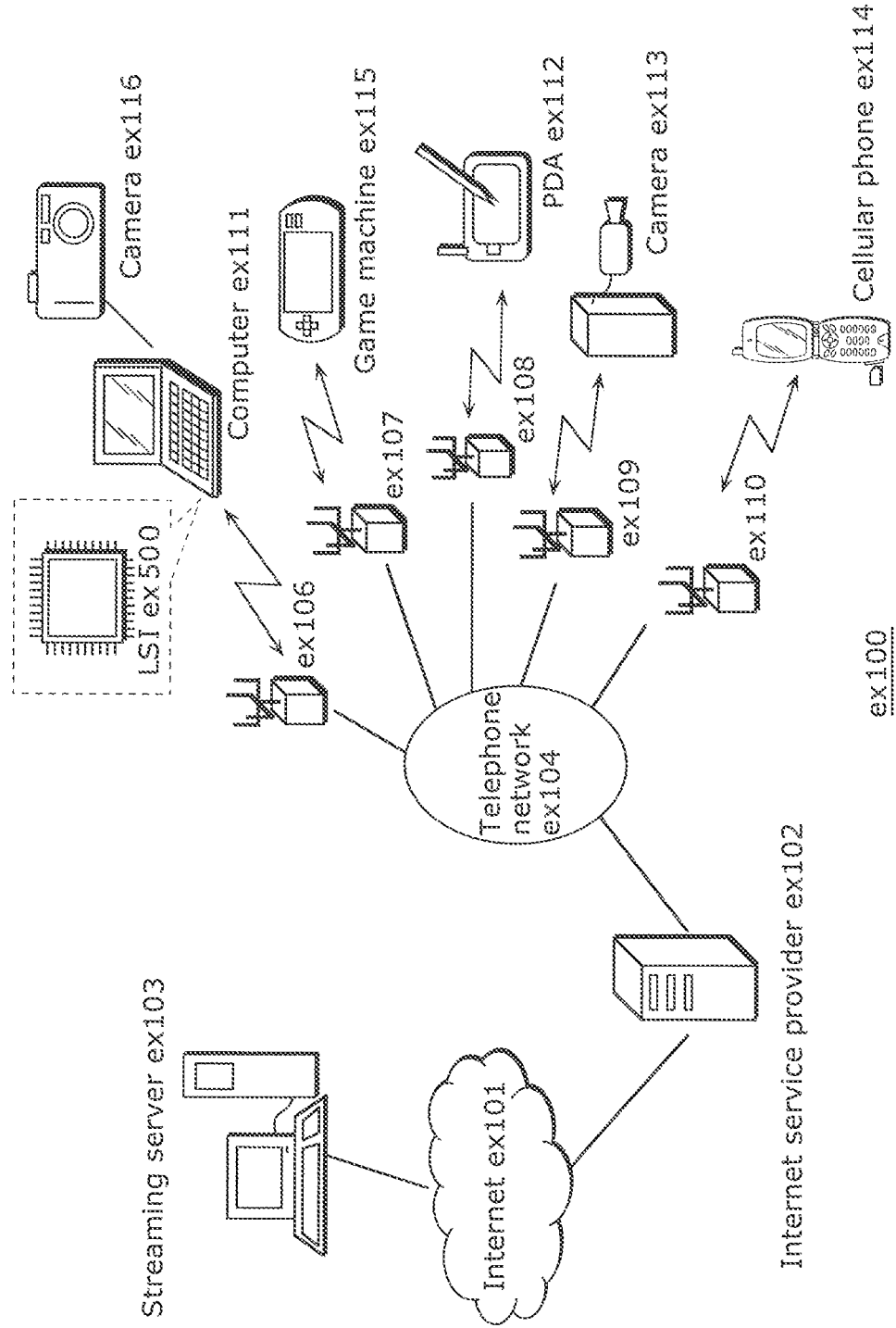
FIG. 15 shows an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
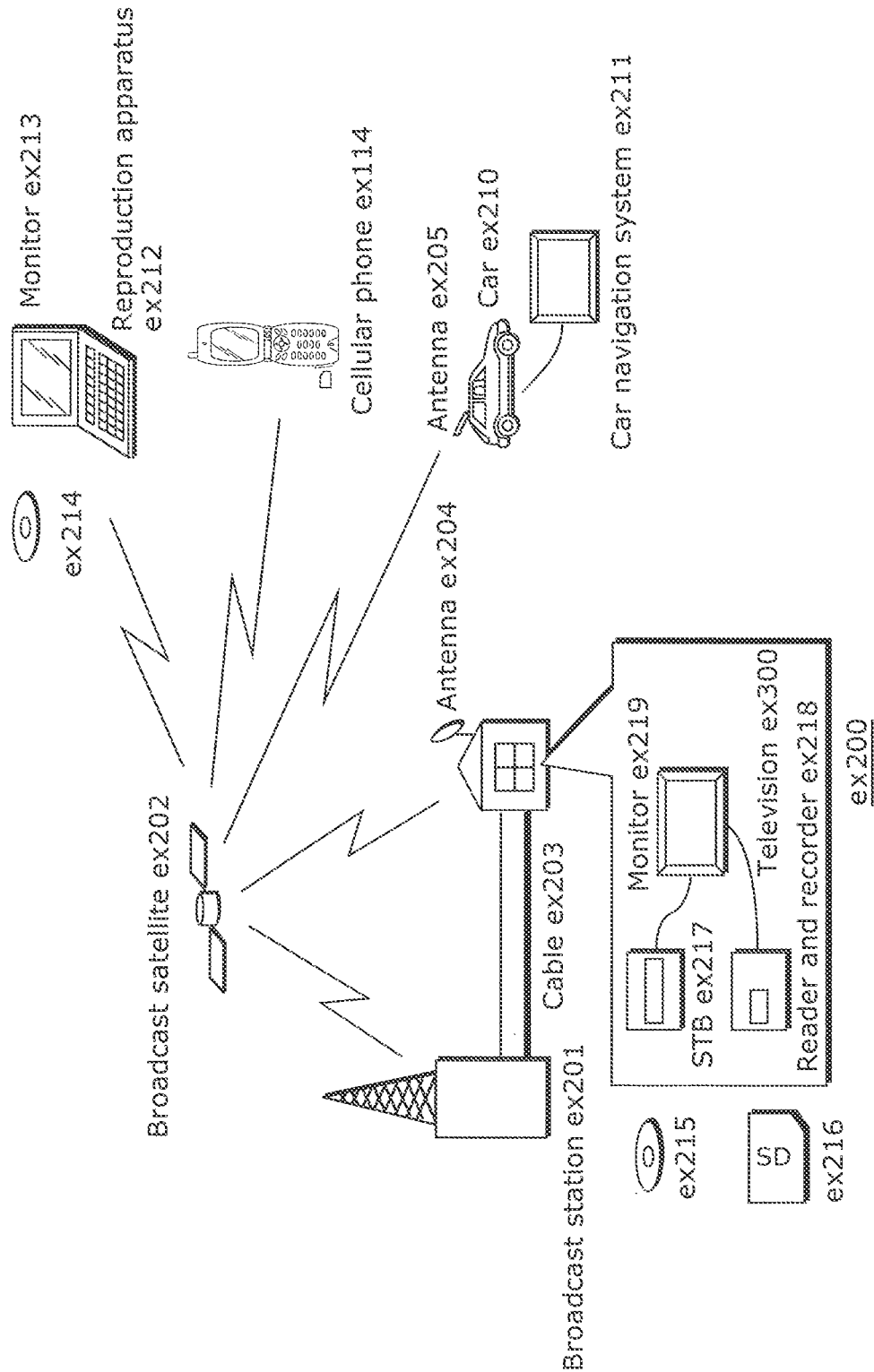
FIG. 16 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
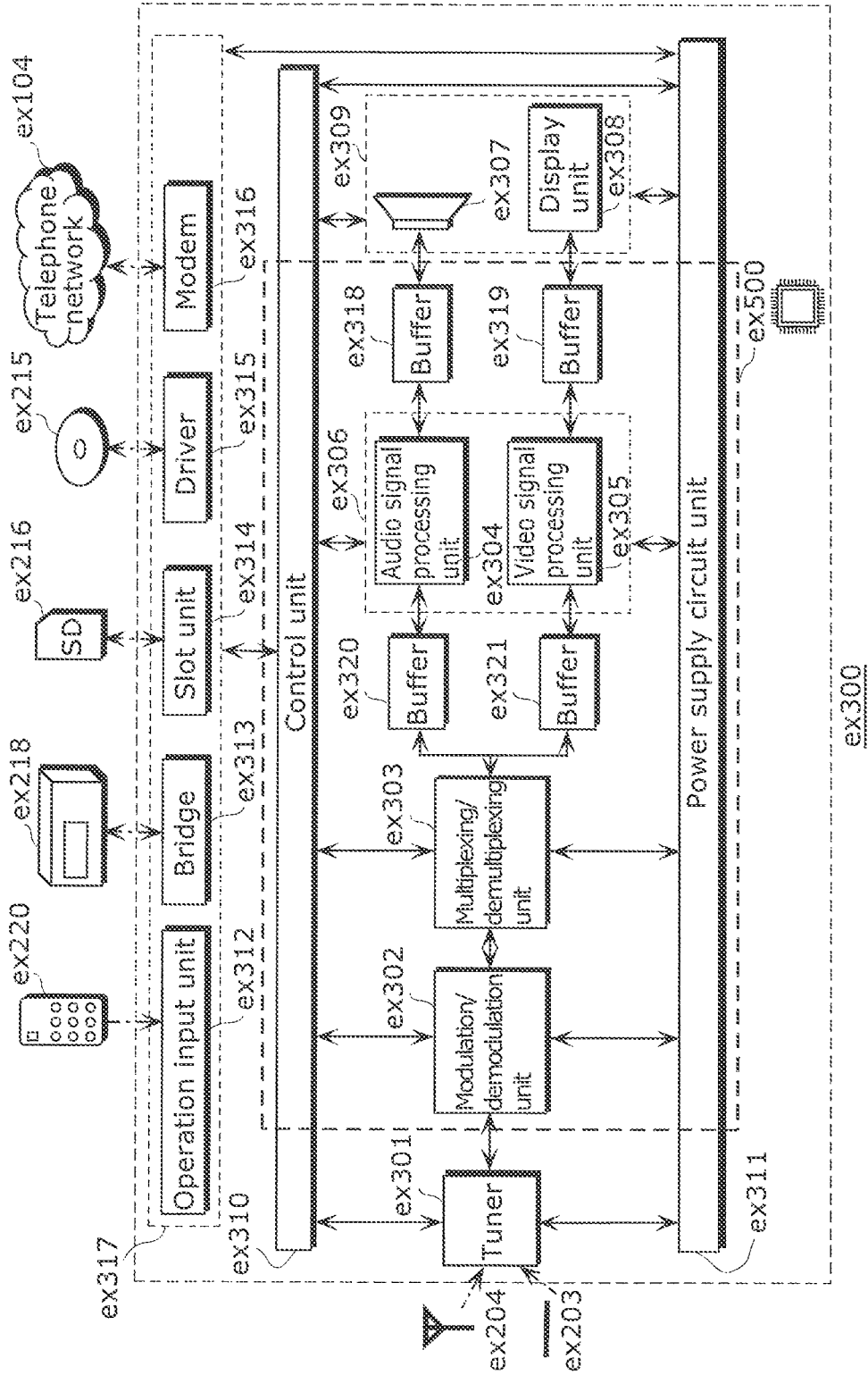
FIG. 17 shows a block diagram illustrating an example of a configuration of a television.

FIG. 17 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 18:
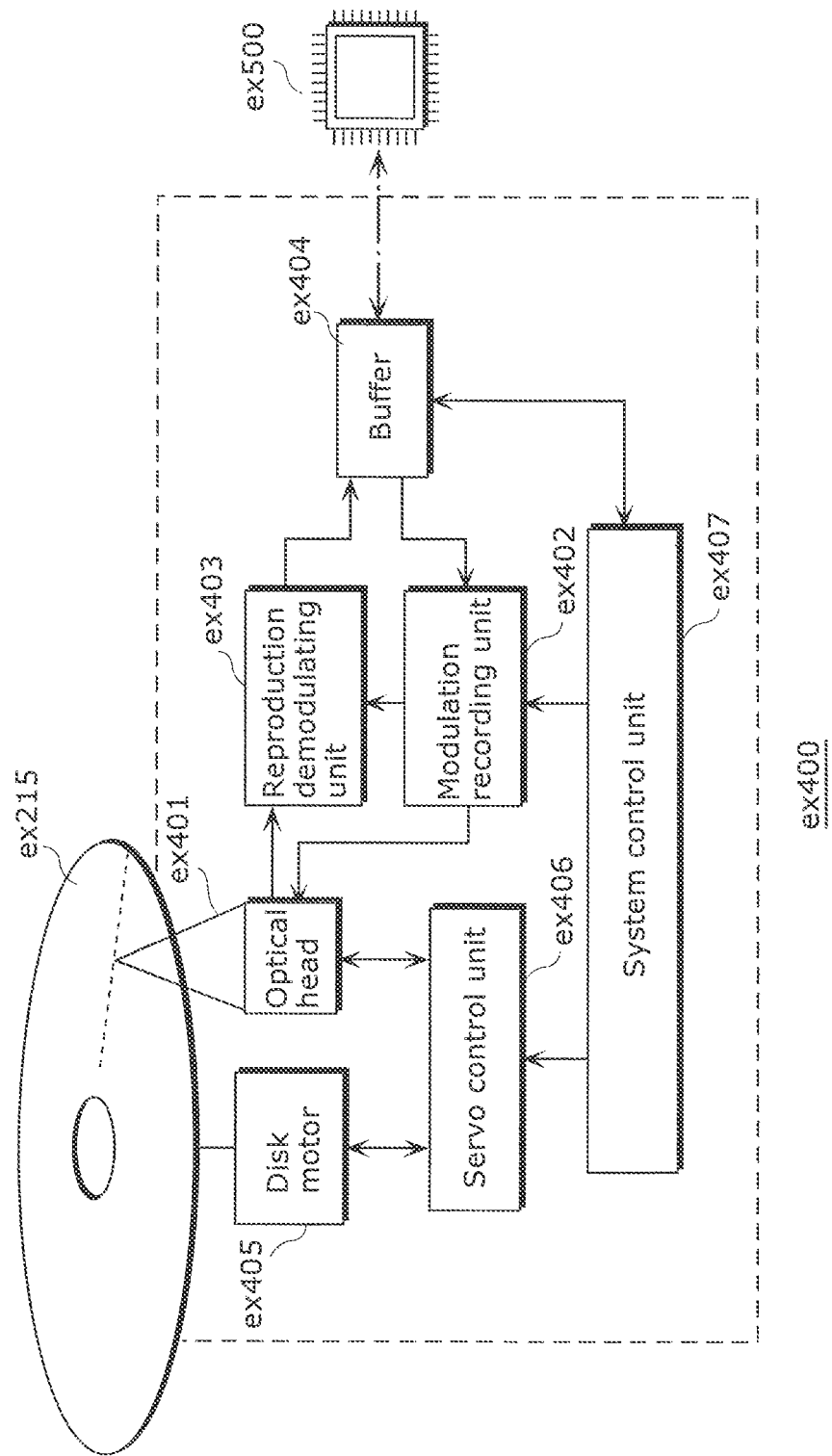
FIG. 18 shows a block diagram illustrating an example of a configuration of an information reproducing/recording unit that reads and writes information from and on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
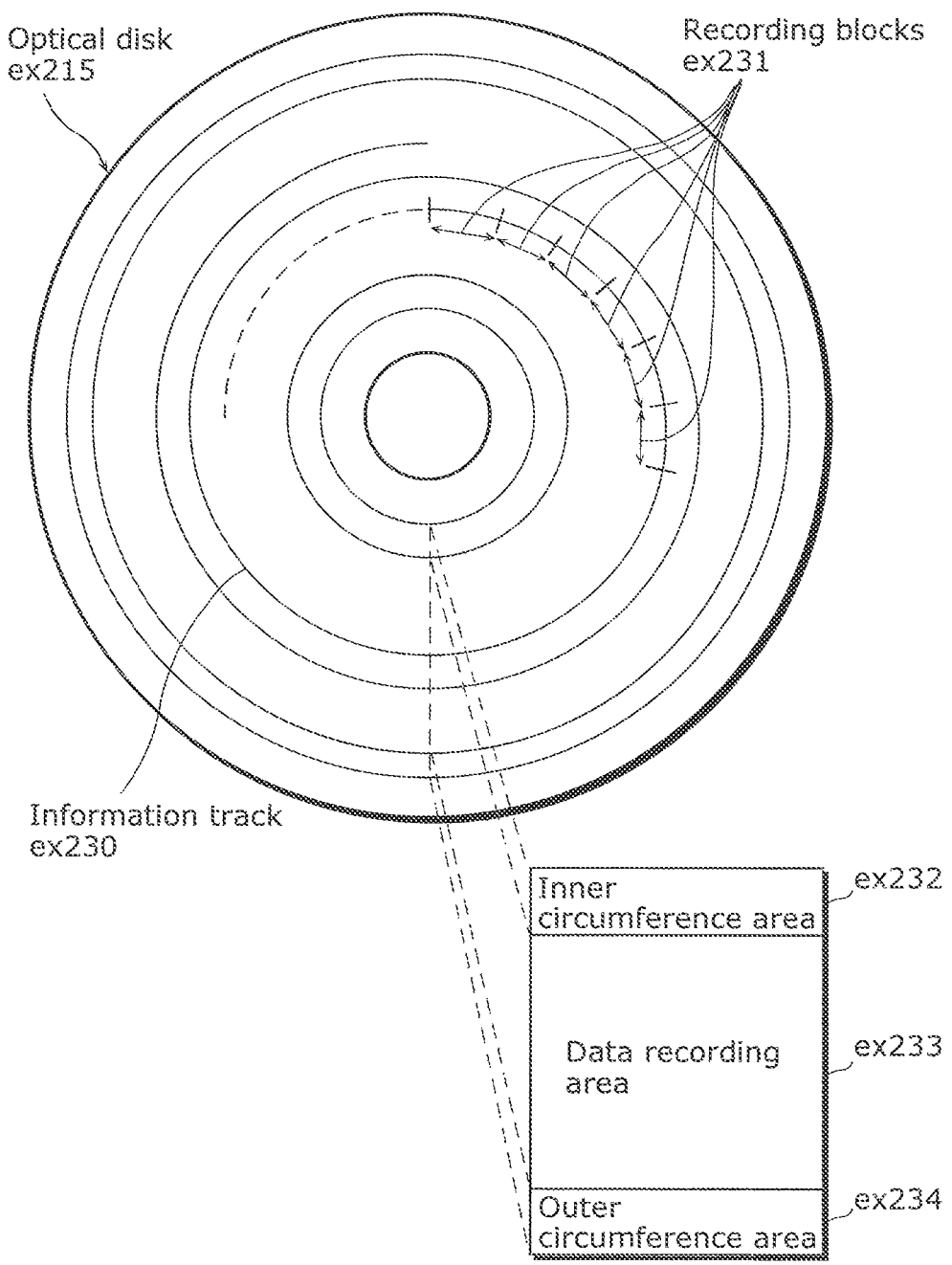
FIG. 19 shows an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
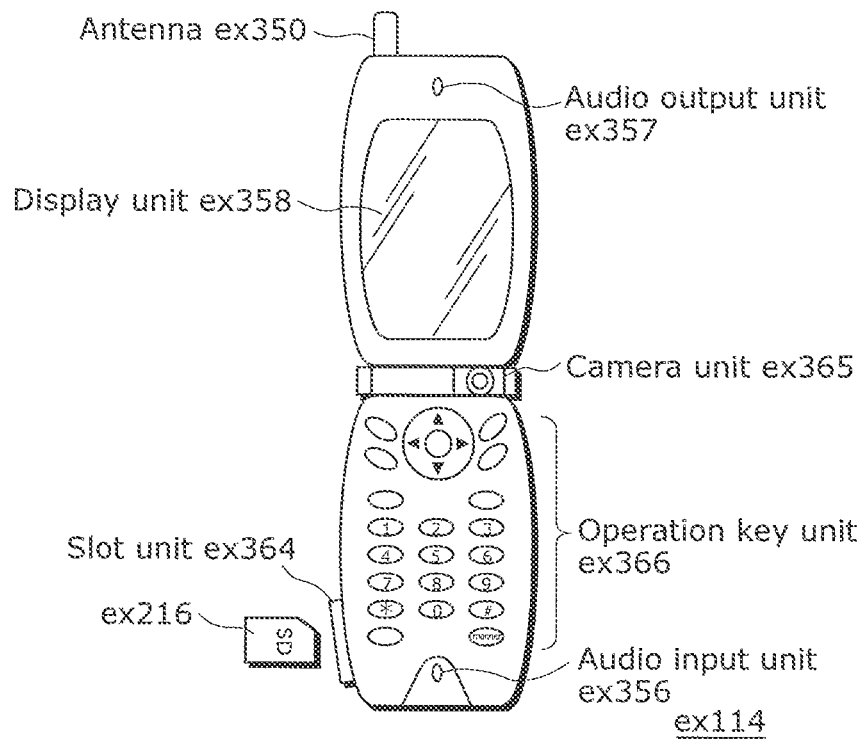
FIG. 20A shows an example of a cellular phone.

FIG. 20A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 20B:
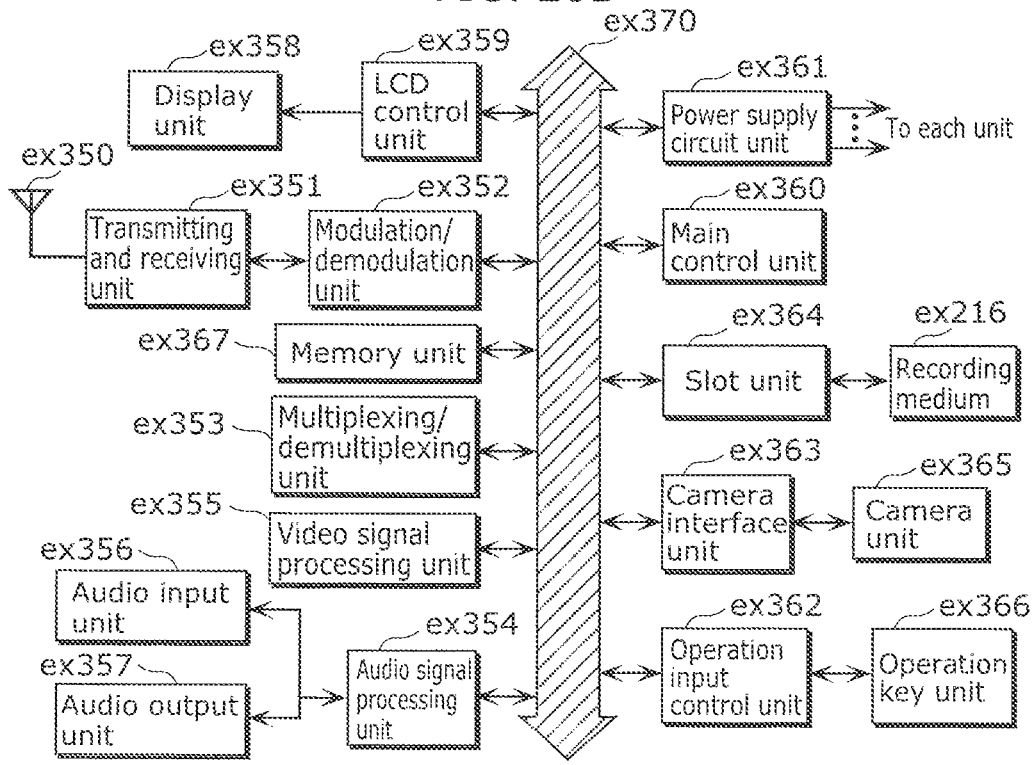
FIG. 20B is a block diagram showing an example of a configuration of a cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-toanalog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 5

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 22:
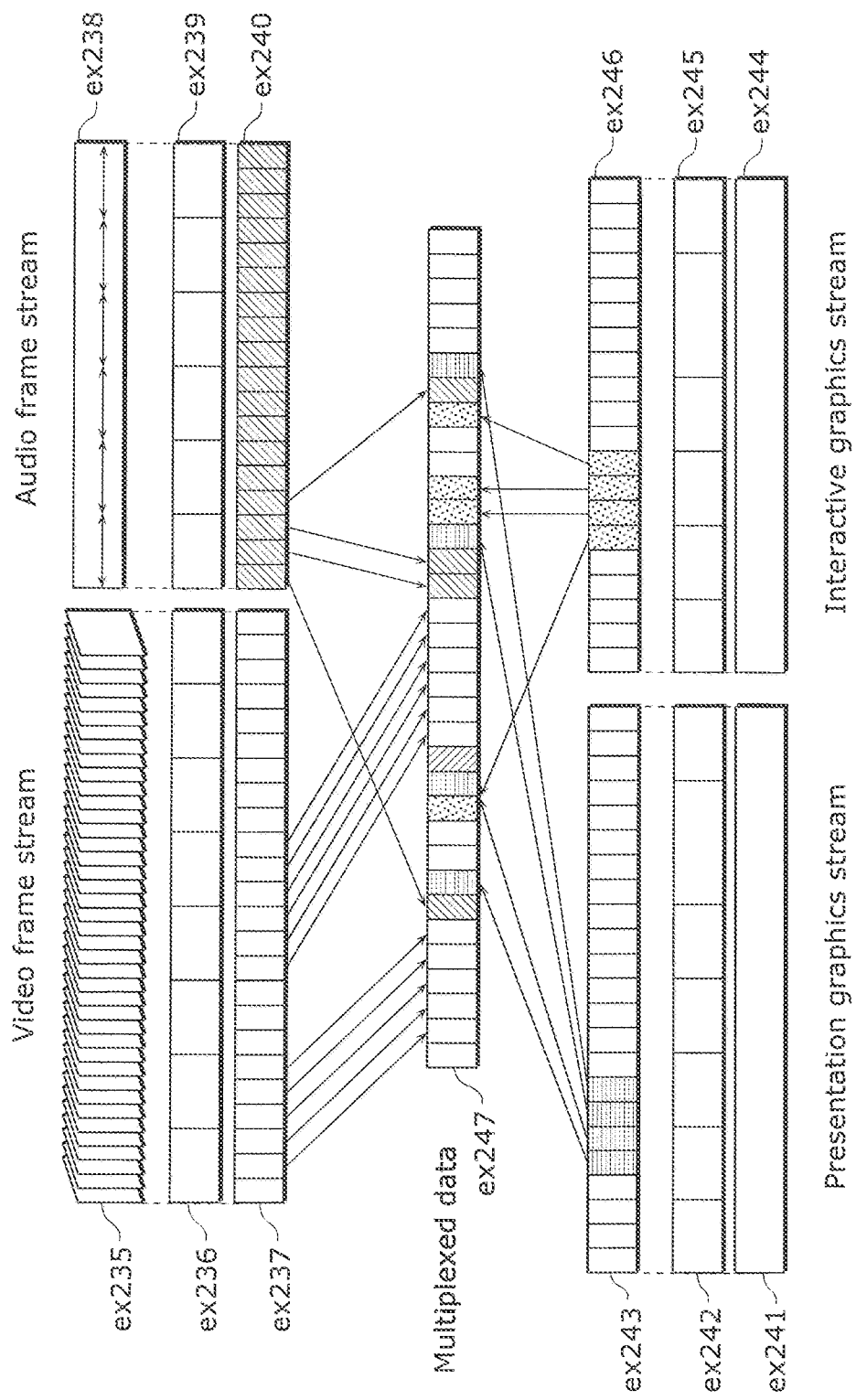
FIG. 22 schematically shows how each stream is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
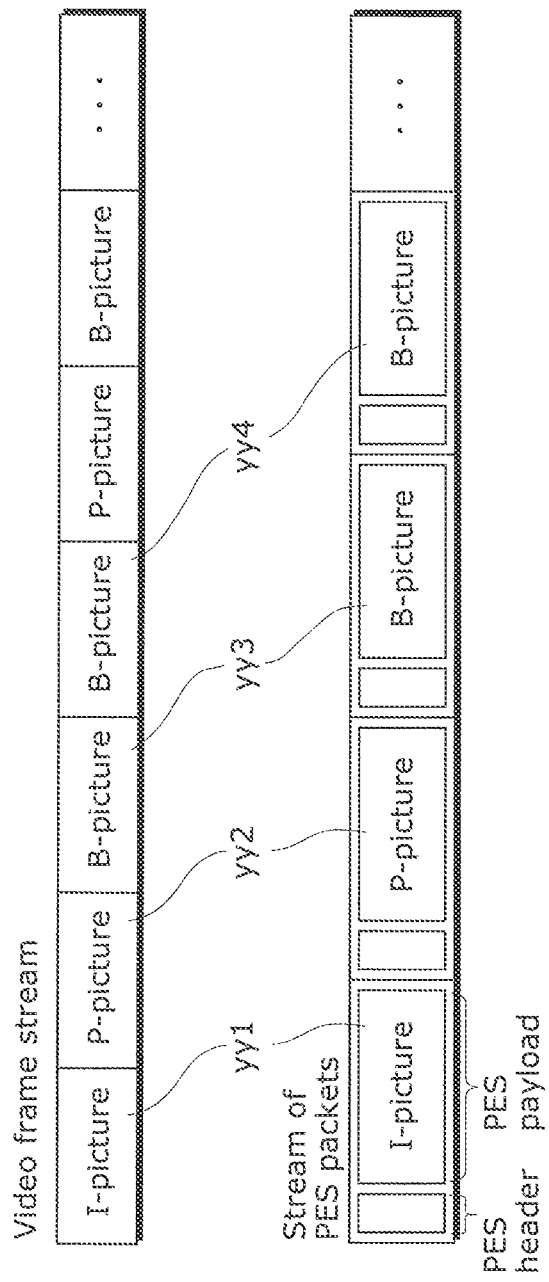
FIG. 23 shows how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 24:
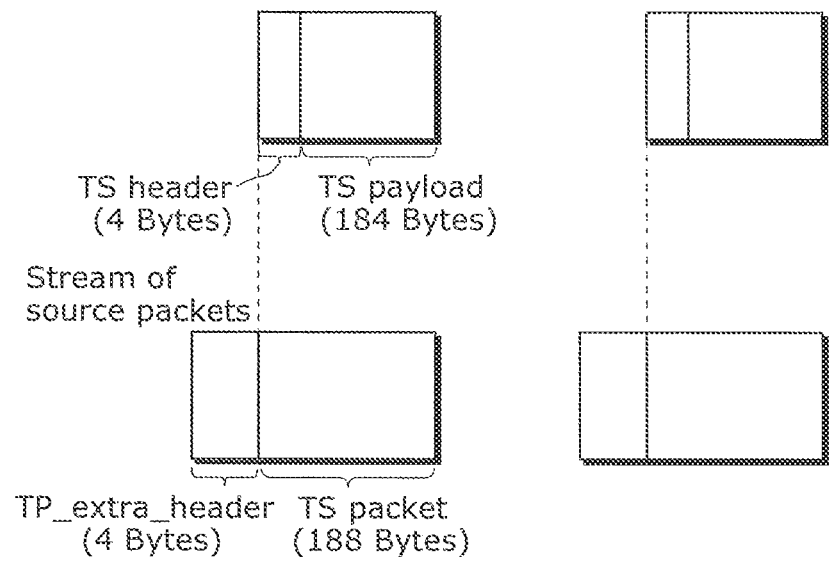
FIG. 24 shows a structure of TS packets and source packets in the multiplexed data.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
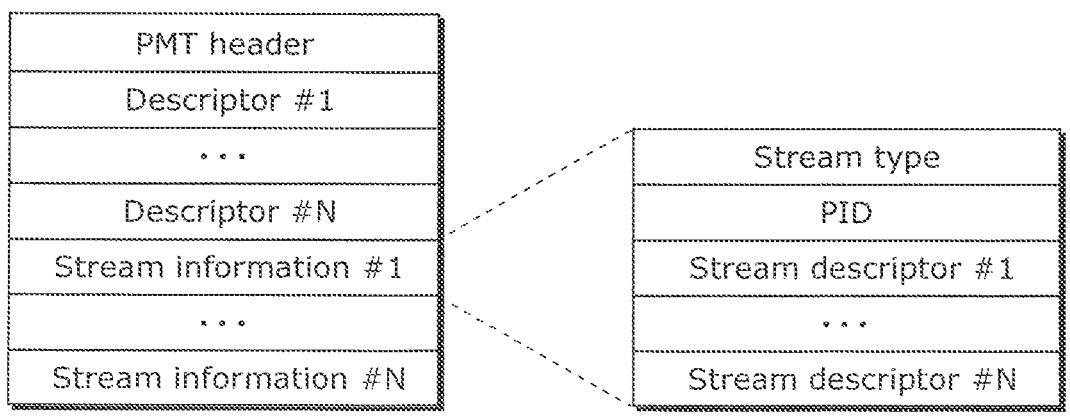
FIG. 25 shows a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
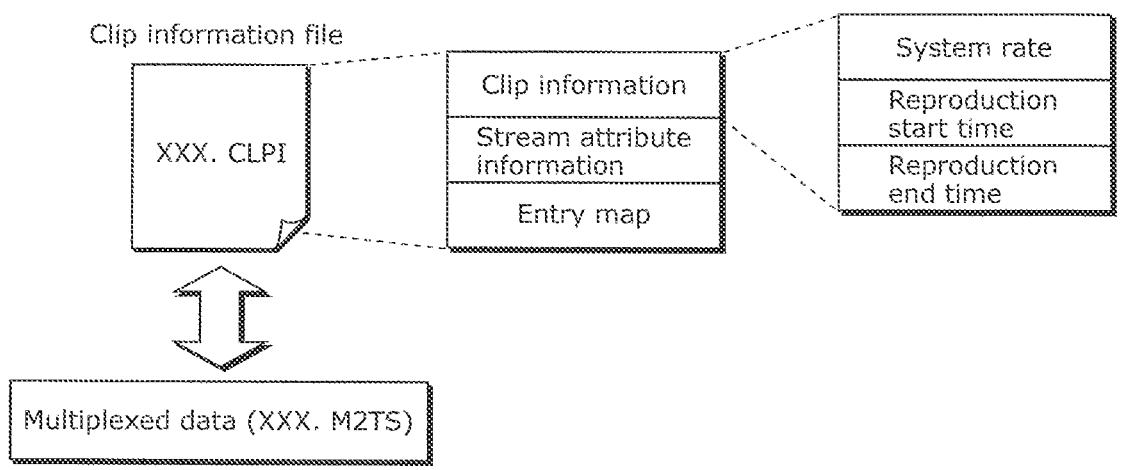
FIG. 26 shows an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
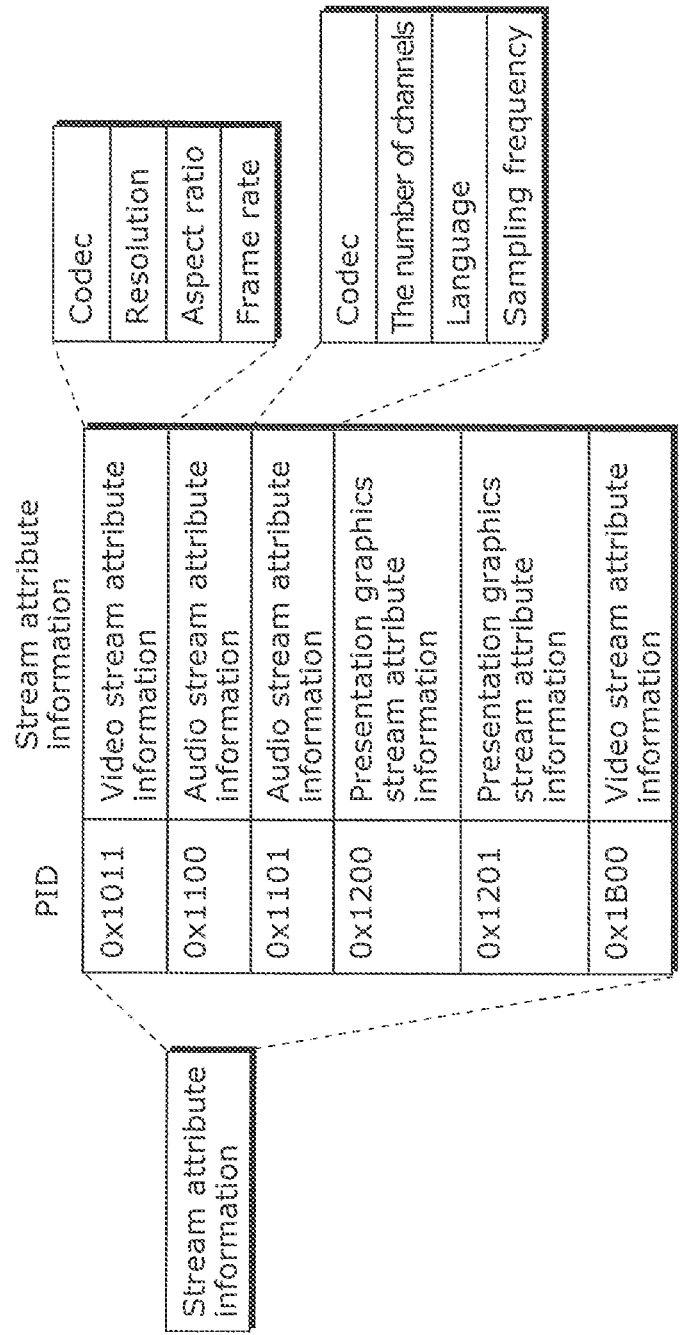
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 28:
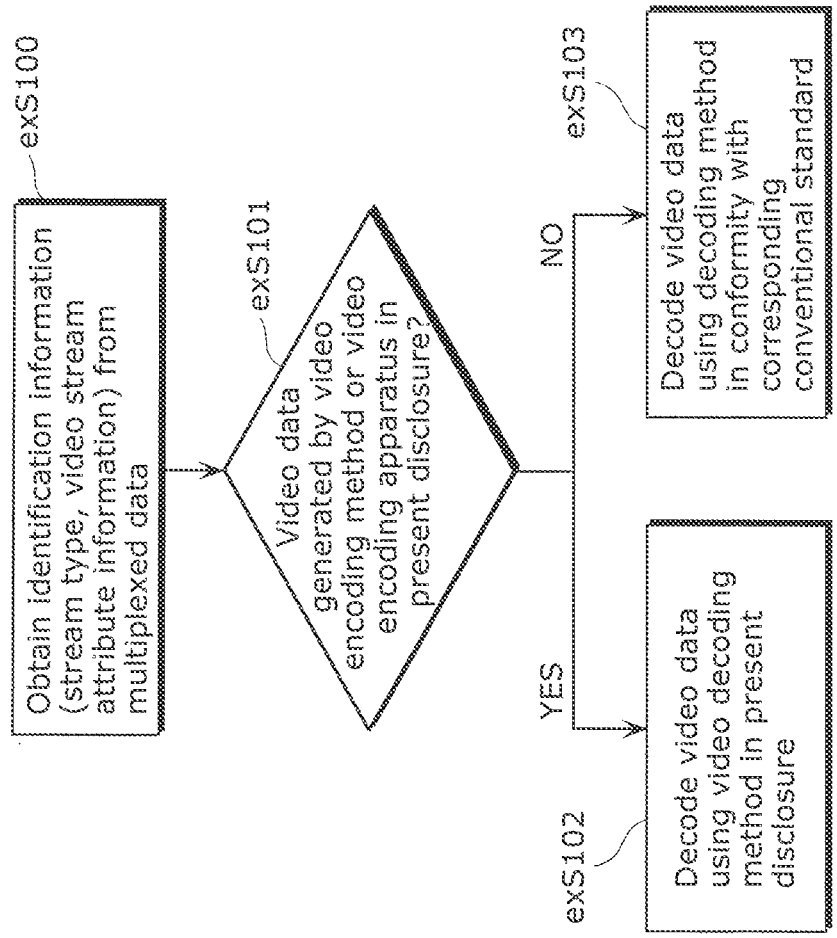
FIG. 28 shows steps for identifying video data.

Furthermore, FIG. 28 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 6

Figure 29:
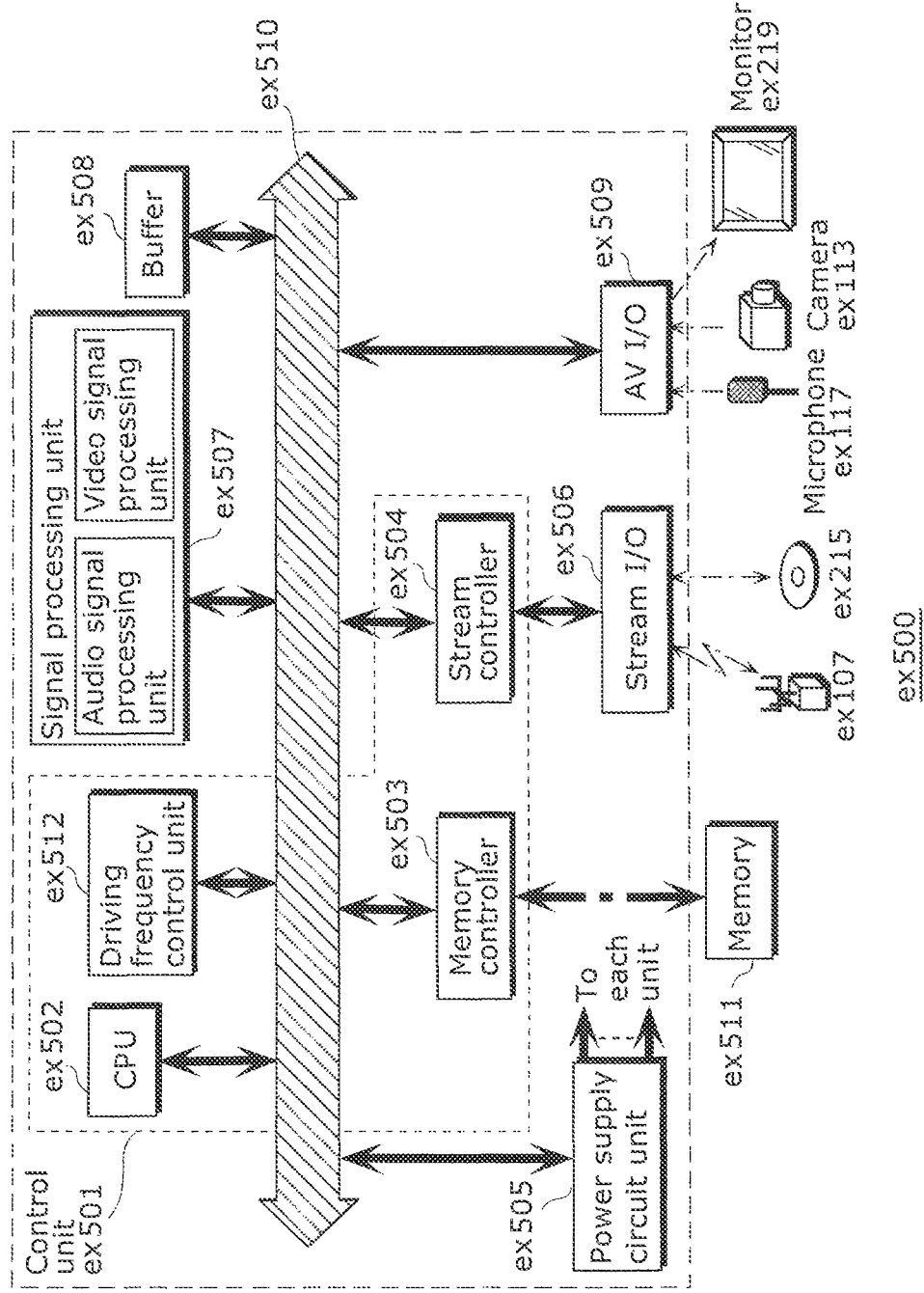
FIG. 29 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 7

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, there is a problem that the power consumption increases when the driving frequency is set higher.

Figure 30:
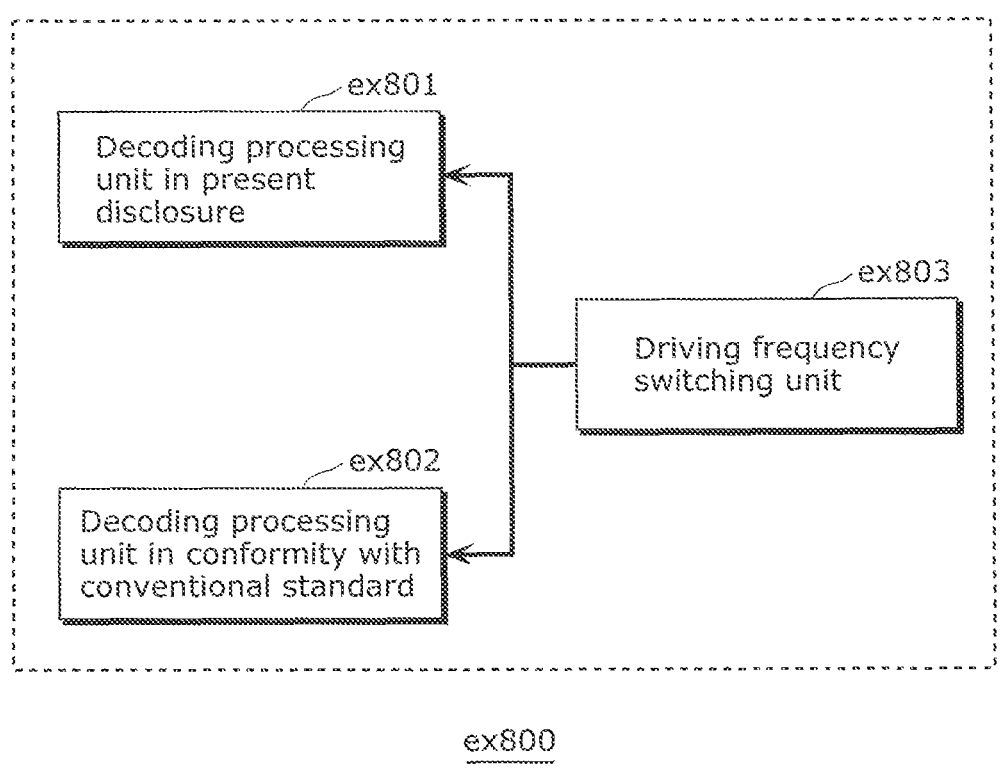
FIG. 30 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
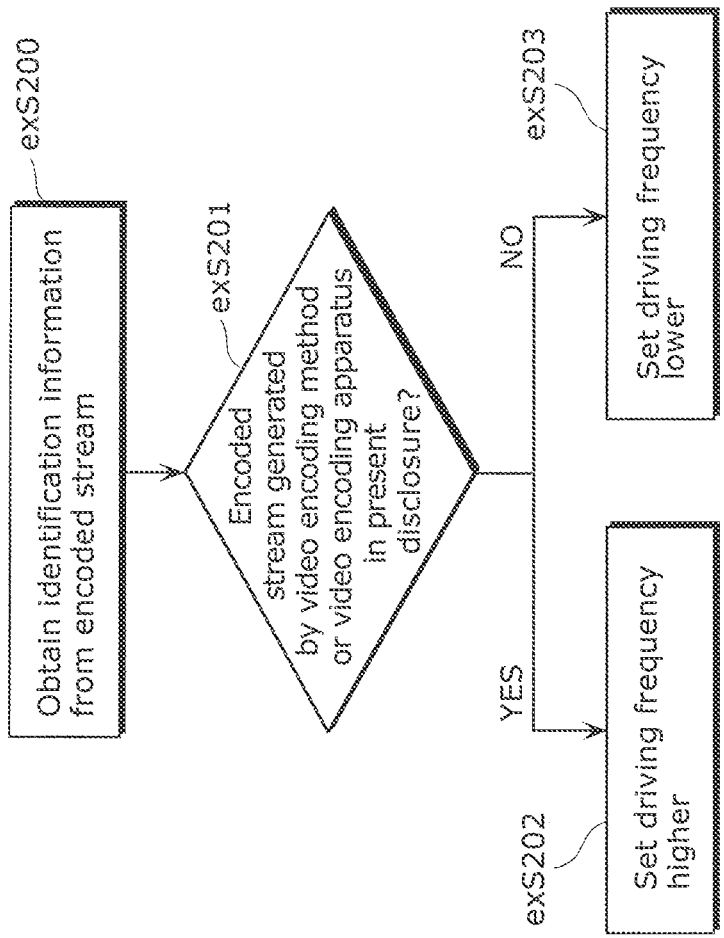
FIG. 31 shows steps for identifying video data and switching between driving frequencies.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by filtering in particular, for example, the dedicated decoding processing unit ex901 is used for filtering. Otherwise, the decoding processing unit is probably shared for one of the entropy decoding, inverse quantization, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 33B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The image encoding method for encoding code streams which facilitate parallel decoding processes according to an aspect of the present disclosure and the image decoding method for decoding the encoded streams make it possible to suppress distortions which occur between image areas subjected to the parallel decoding processes. These encoding method and decoding method make it possible to implement, at low cost, an image encoding device and an image decoding device capable of performing high-speed operation, and thus are applicable to various applications such as storage, transmission, communication, etc. For example, the image encoding device and the image decoding device are applicable to high-resolution information display devices and imaging devices such as television receivers, digital video recorders, car navigation systems, mobile phones, digital cameras, digital video cameras, etc, and thus are highly applicable.

The invention claimed is:

1. An image encoding method comprising:
    first filtering for filtering a first boundary between a current block included in an image and an encoded neighboring block neighboring the current block, using a first filter strength which is set using information of the current block and information of the encoded neighboring block;
    second filtering for filtering a second boundary using a second filter strength which is determined based on filtering related information encoded into a bitstream, the second boundary being a boundary between units, and the units being larger than each of the current block and the encoded neighboring block;
    determining whether a third boundary is the second boundary, using
        (i) either (a) filter_hint_type included in SEI information, the filter_hint_type indicating a filter for a boundary between tiles or a boundary between slices or (b) additional_extension_flag included in the SEI information, the additional_extension_flag indicating a filter for a boundary between tiles or a boundary between slices, and
        (ii) an encoded parameter indicating which one of a tile boundary and a slice boundary each having a value of across_filter_type is to be filtered; and
    switching whether or not to execute the second filtering on the third boundary, based on a result of the determining,
    wherein the first filtering is executed on the third boundary without performing the second filtering of the third boundary when the third boundary is determined not to be the second boundary, and the current block whose boundary has been filtered in the first filtering is used as a reference block for another block,
    wherein the second filtering is executed on the third boundary without performing the first filtering of the third boundary when the third boundary is determined to be the second boundary, and the current block whose boundary has been filtered in the second filtering is not used as a reference block for another block,
    wherein when the additional_extension_flag has a value indicating the filter for the boundary between tiles or the boundary between slices, the value of the across_filter_type has (i) a first value indicating filtering across the boundary between tiles is disabled and filtering across the boundary between slices is disabled, (ii) a second value indicating filtering across the boundary between tiles is enabled and filtering across the boundary between slices is disabled, (iii) a third value indicating filtering across the boundary between tiles is disabled and filtering across the boundary between slices is enabled, and (iv) a fourth value indicating filtering across the boundary between tiles is enabled and filtering across the boundary between slices is enabled, and
    wherein when the filter_hint_type has a first value indicating coefficients of a 2D FIR filter, a second value indicating coefficients of two 1D FIR filter, a third value indicating a cross-correlation matrix, or a fourth value indicating the value of the across_filter_type.

2. An image encoding device comprising:
a processing circuitry; and
a storage which is coupled to the processing circuitry,
wherein the processing circuitry executes encoding including:
    first filtering for filtering a first boundary between a current block included in an image and an encoded neighboring block neighboring the current block, using a first filter strength which is set using information of the current block and information of the encoded neighboring block;
    second filtering for filtering a second boundary using a second filter strength which is determined based on filtering related information encoded into a bitstream, the second boundary being a boundary between units, and the units being larger than each of the current block and the encoded neighboring block;
    determining whether a third boundary is the second boundary, using
        (i) either (a) filter_hint_type included in SEI information, the filter_hint_type indicating a filter for a boundary between tiles or a boundary between slices or (b) additional_extension_flag included in the SEI information, the additional_extension_flag indicating a filter for a boundary between tiles or a boundary between slices, and
        (ii) an encoded parameter indicating which one of a tile boundary and a slice boundary each having a value of across_filter_type is to be filtered; and
    switching whether or not to execute the second filtering on the third boundary, based on a result of the determining,
    wherein the first filtering is executed on the third boundary without performing the second filtering of the third boundary when the third boundary is determined not to be the second boundary, and the current block whose boundary has been filtered in the first filtering is used as a reference block for another block, wherein the second filtering is executed on the third boundary without performing the first filtering of the third boundary when the third boundary is determined to be the second boundary, and the current block whose boundary has been filtered in the second filtering is not used as a reference block for another block, wherein when the additional_extension_flag has a value indicating the filter for the boundary between tiles or the boundary between slices, the value of the across_filter_type has (i) a first value indicating filtering across the boundary between tiles is disabled and filtering across the boundary between slices is disabled, (ii) a second value indicating filtering across the boundary between tiles is enabled and filtering across the boundary between slices is disabled, (iii) a third value indicating filtering across the boundary between tiles is disabled and filtering across the boundary between slices is enabled, and (iv) a fourth value indicating filtering across the boundary between tiles is enabled and filtering across the boundary between slices is enabled, and wherein when the filter_hint_type has a first value indicating coefficients of a 2D FIR filter, a second value indicating coefficients of two 1D FIR filter, a third value indicating a cross-correlation matrix, or a fourth value indicating the value of the across_filter_type.

\* \* \* \* \*